(12) United States Patent
Cote et al.

(10) Patent No.: US 11,731,151 B2
(45) Date of Patent: Aug. 22, 2023

(54) SPRINKLER SYSTEM ACCOUNTING FOR WIND EFFECT

(71) Applicant: Kristy Cote, Cochrane (CA)

(72) Inventors: Cameron Cote, Cochrane (CA); Yile Zhang, Vancouver (CA)

(73) Assignee: Kristy Cote, Cochrane (CA)

( * ) Notice: Subject to any disclaimer, the term of this patent is extended or adjusted under 35 U.S.C. 154(b) by 0 days.

(21) Appl. No.: 17/888,854

(22) Filed: Aug. 16, 2022

(65) Prior Publication Data

US 2022/0401985 A1 Dec. 22, 2022

Related U.S. Application Data

(62) Division of application No. 16/491,495, filed as application No. PCT/CA2017/000250 on Nov. 24, 2017, now abandoned.

(30) Foreign Application Priority Data

Nov. 28, 2016 (CA) .................................. CA 2949767

(51) Int. Cl.
*B05B 12/12* (2006.01)
*A01G 25/16* (2006.01)
*B05B 3/02* (2006.01)

(52) U.S. Cl.
CPC .............. *B05B 12/12* (2013.01); *A01G 25/16* (2013.01); *B05B 3/02* (2013.01)

(58) Field of Classification Search
CPC ........... B05B 12/12; B05B 3/02; B05B 12/08; A01G 25/16
See application file for complete search history.

(56) References Cited

U.S. PATENT DOCUMENTS

| 4,209,131 | A | | 6/1980 | Barash et al. |
| 4,411,386 | A | * | 10/1983 | Disbrow .............. A01G 25/092 239/DIG. 1 |
| 7,877,168 | B1 | | 1/2011 | Porter et al. |
| 2003/0111546 | A1 | * | 6/2003 | Schaffter ............. A01M 7/0089 239/69 |
| 2005/0211794 | A1 | | 9/2005 | Clark et al. |
| 2010/0012744 | A1 | | 1/2010 | Kates |
| 2010/0070097 | A1 | | 3/2010 | Morgenstern et al. |
| 2012/0221154 | A1 | | 8/2012 | Runge |

(Continued)

FOREIGN PATENT DOCUMENTS

| CN | 104023520 A * | 9/2014 | ............. A01G 25/16 |
| WO | 2005069988 A2 | 8/2005 | |

(Continued)

OTHER PUBLICATIONS

ISA/CA, International Search Report dated Mar. 2, 2018 in PCT/CA2017/000250, 3 pages.

(Continued)

*Primary Examiner* — Chad G Erdman
(74) *Attorney, Agent, or Firm* — ATMAC Patent Services Ltd.; Andrew T. MacMillan

(57) ABSTRACT

A novel sprinkler system designed to take into account the effect of wind on water droplets. There is also disclosed a wind shifting algorithm which, when used, corrects the sprinkler water spray to counteract the effect of wind, such that good water coverage and precipitation uniformity can be achieved.

13 Claims, 34 Drawing Sheets

(56) References Cited

U.S. PATENT DOCUMENTS

| | | | |
|---|---|---|---|
| 2015/0306618 A1* | 10/2015 | Petter | B05B 1/12 239/69 |
| 2017/0127625 A1 | 5/2017 | Hattar et al. | |
| 2018/0117613 A1 | 5/2018 | Zito, Jr. et al. | |
| 2020/0016618 A1 | 1/2020 | Cote | |

FOREIGN PATENT DOCUMENTS

| | | | |
|---|---|---|---|
| WO | 2006060465 A2 | 6/2006 |
| WO | 2013006213 A1 | 1/2013 |
| WO | 2015157844 A1 | 10/2015 |

OTHER PUBLICATIONS

ISA/CA, Written Opinion of the International Searching Authority dated Mar. 2, 2018 in PCT/CA2017/000250, 3 pages.
IP Australia, "Examination report No. 1 for your standard patent application", Office action dated Dec. 12, 2022 in counterpart Australian patent application No. 2017363832.
EPO, "Extended European search report" dated Nov. 25, 2020 in counterpart European patent application No. 17874298.7 (EP3565403).

\* cited by examiner

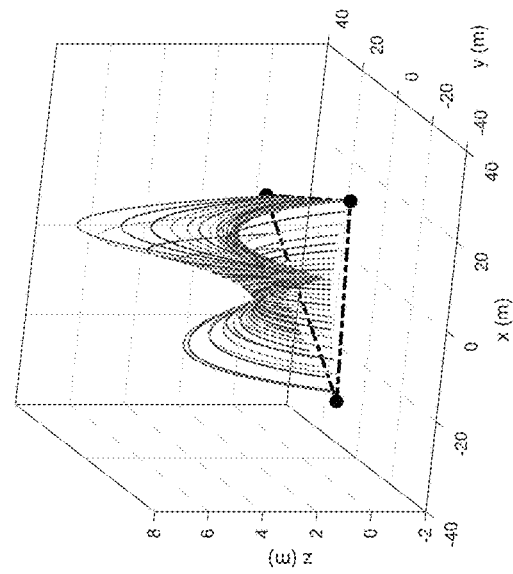
FIG. 8A Triangular lawn
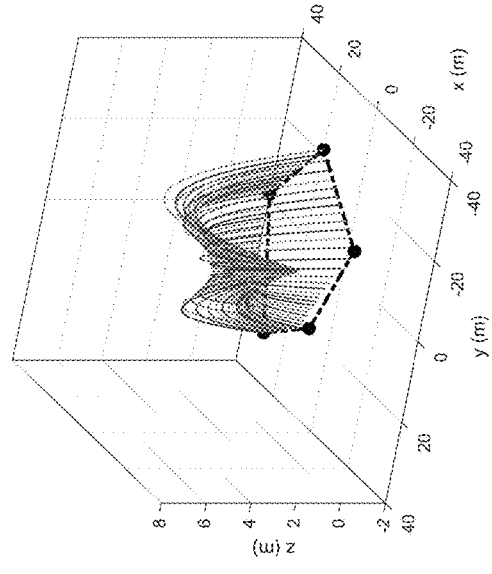
FIG. 8B Triangular lawn
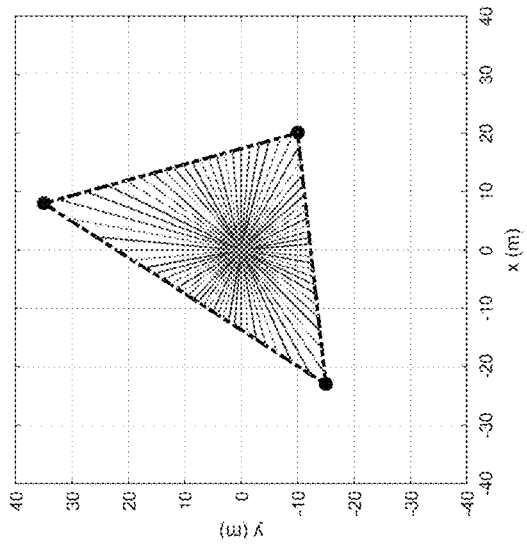
FIG. 8C Pentagonal lawn
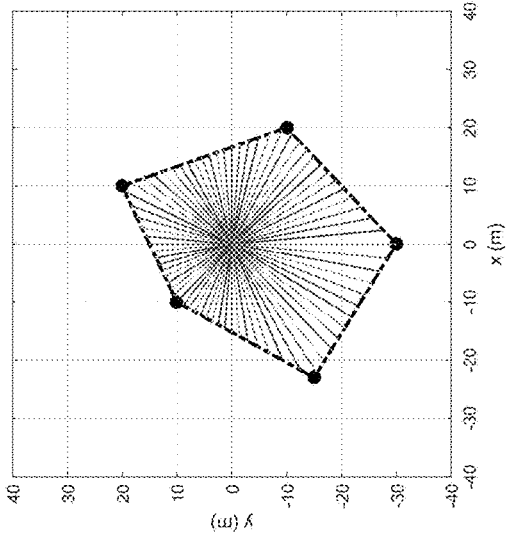
FIG. 8D pentagonal lawn

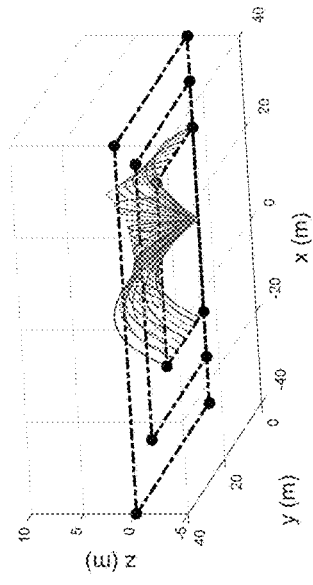
FIG. 9A  First round spraying
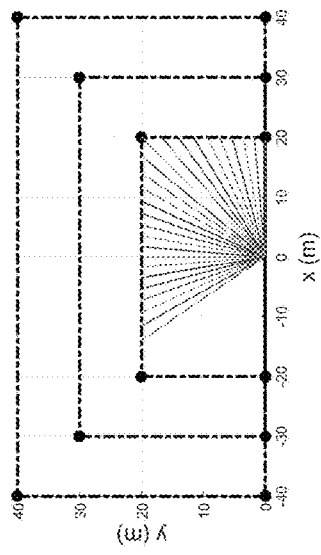
FIG. 9B  First round spraying
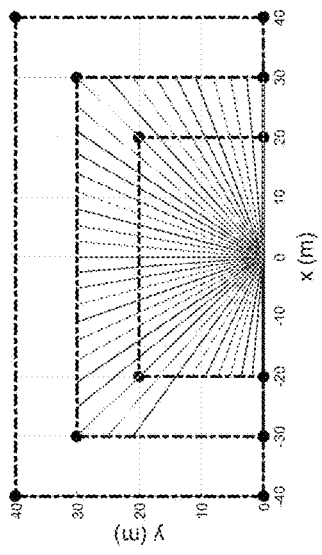
FIG. 9C  Second round spraying
FIG. 9D  Second round spraying
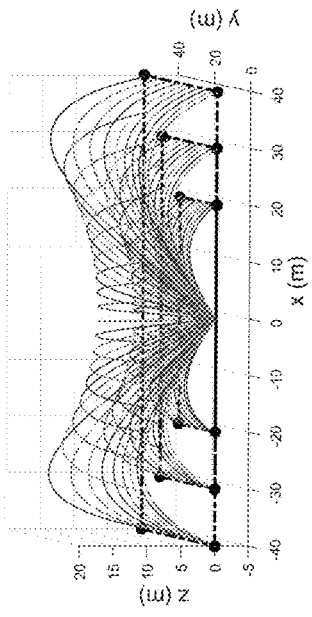
FIG. 9E  Third round spraying
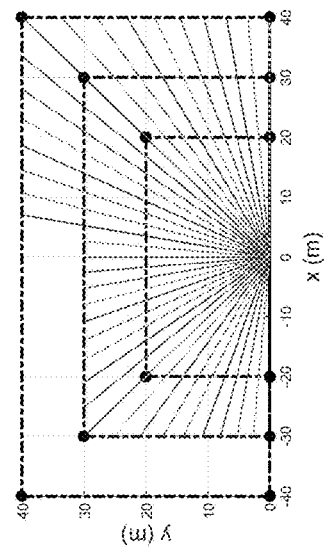
FIG. 9F  Third round spraying

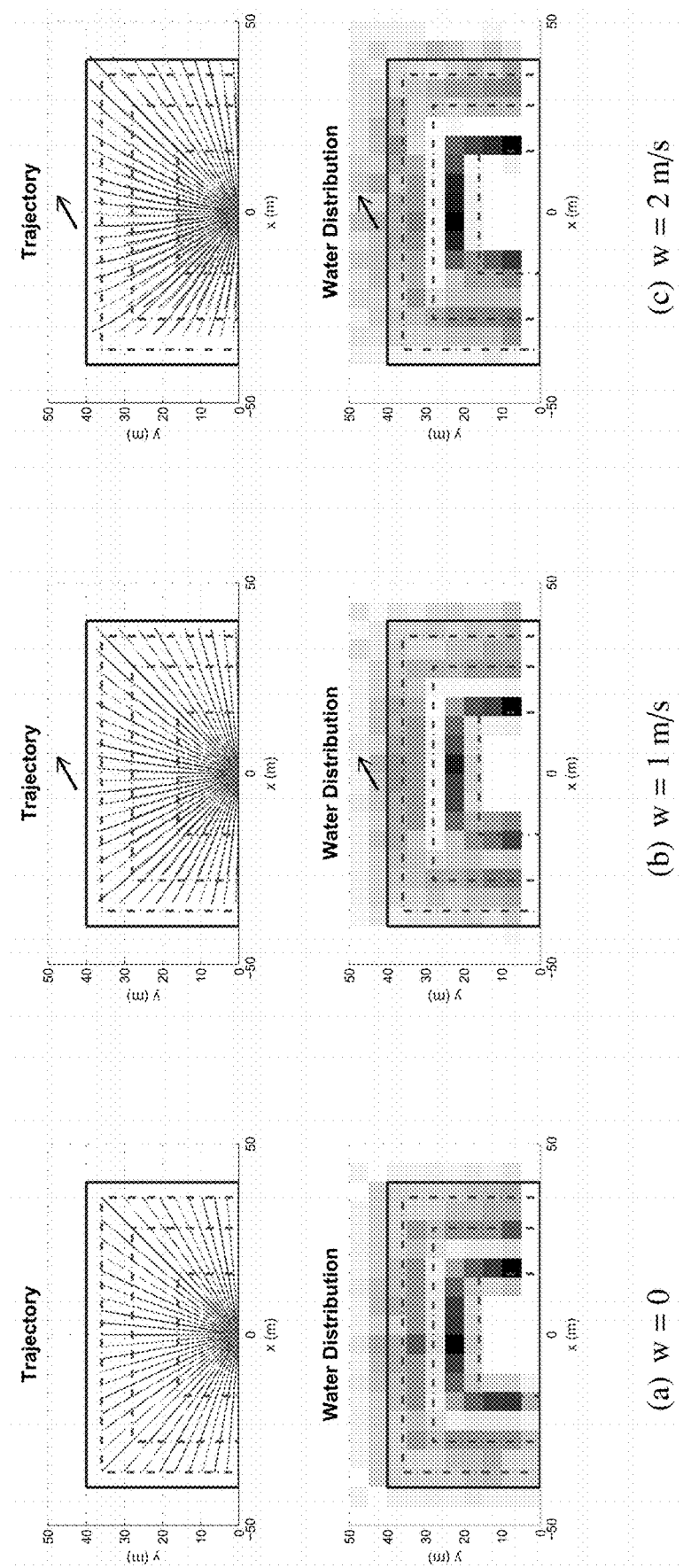
FIG. 12A (a) w = 0
FIG. 12B (b) w = 1 m/s
FIG. 12C (c) w = 2 m/s

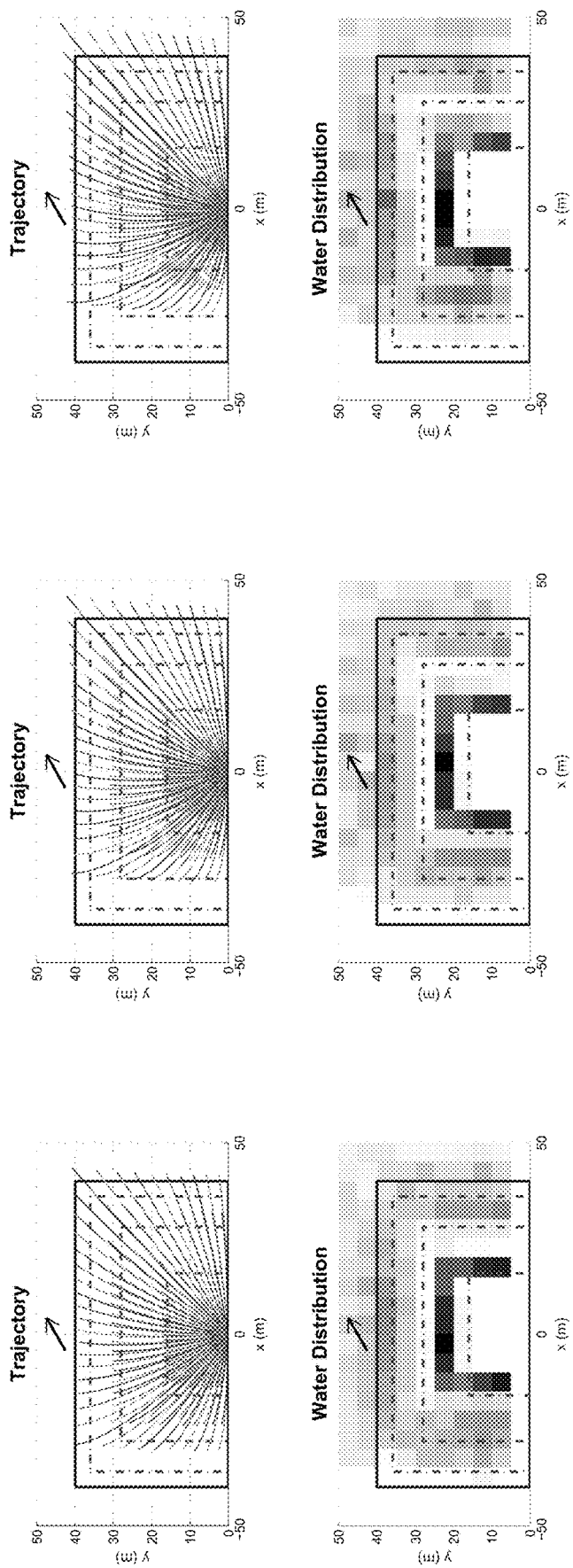

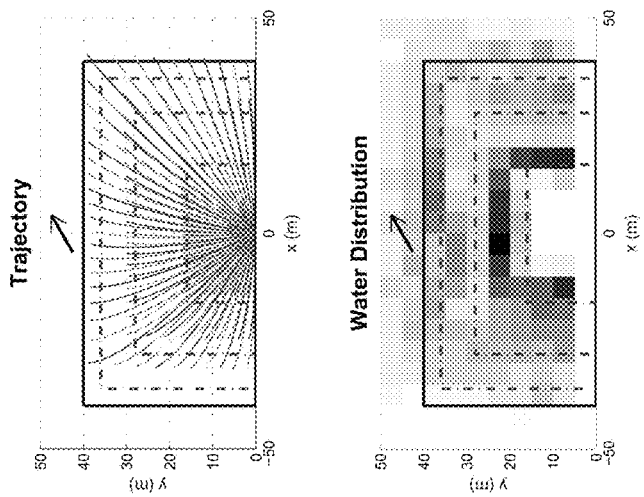
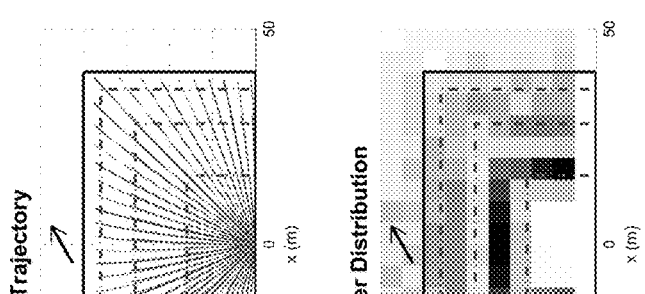
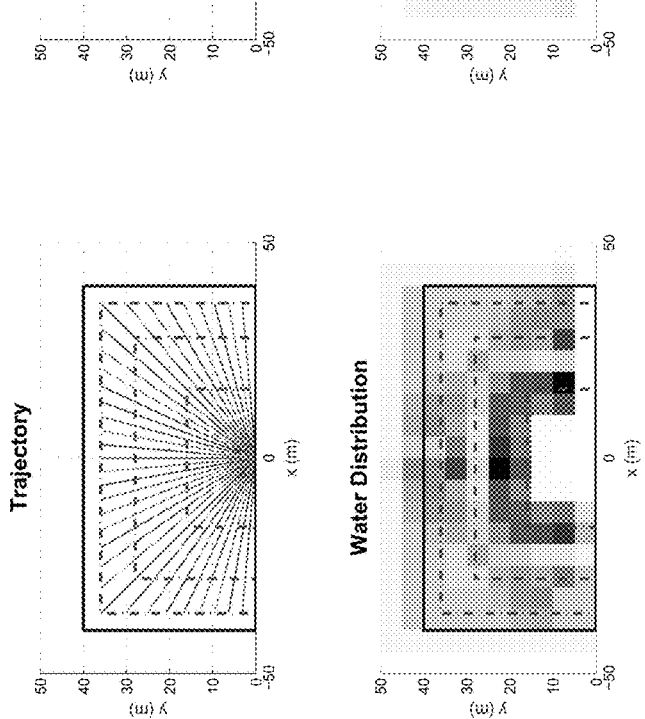
(a) w = 0
FIG. 13A
(b) w = 1 m/s
FIG. 13B
(c) w = 2 m/s
FIG. 13C (d) w = 3 m/s (e) w = 4 m/s (f) w = 5 m/s

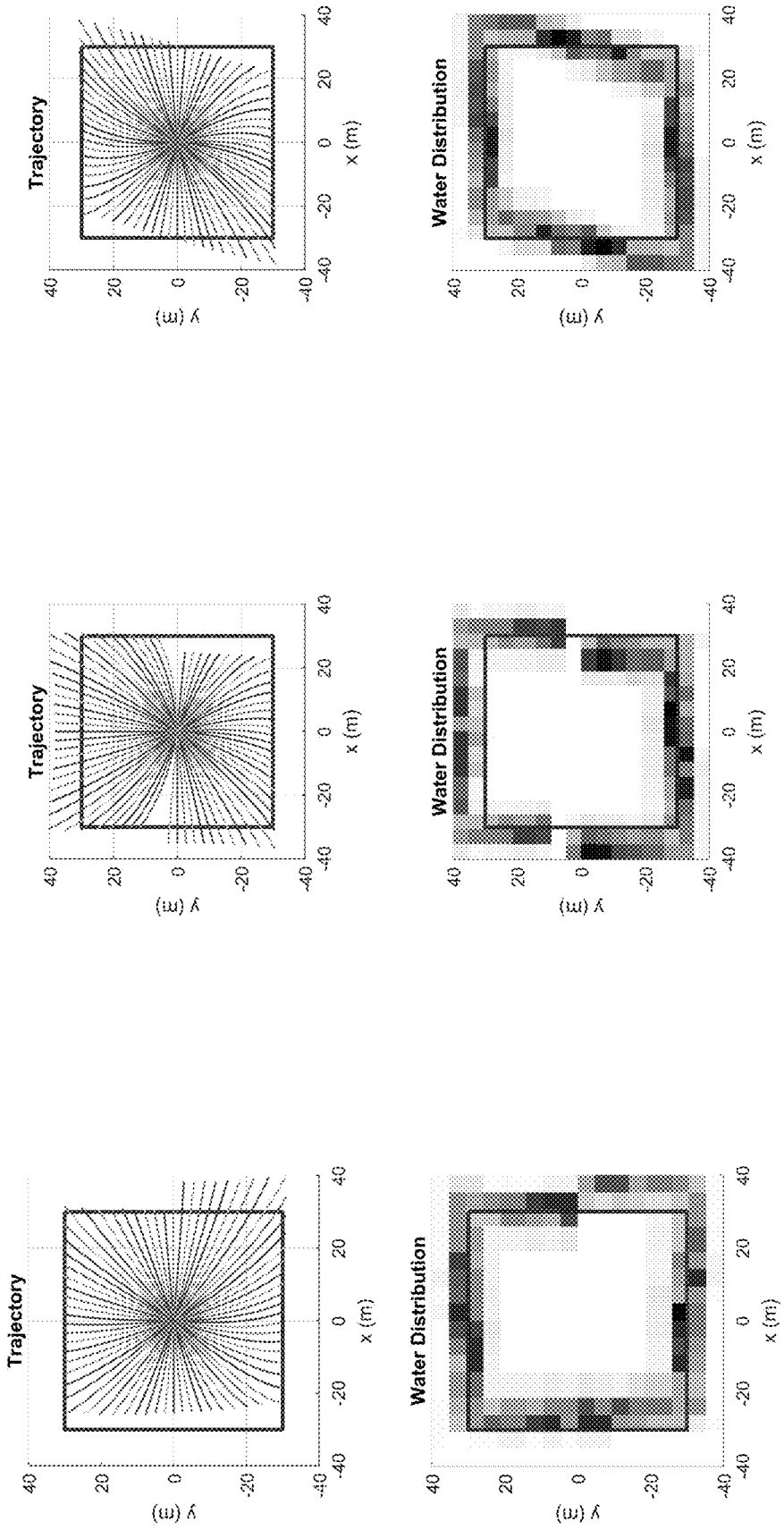
FIG. 14A (a) case 1
FIG. 14B (b) case 2
FIG. 14C (c) case 3

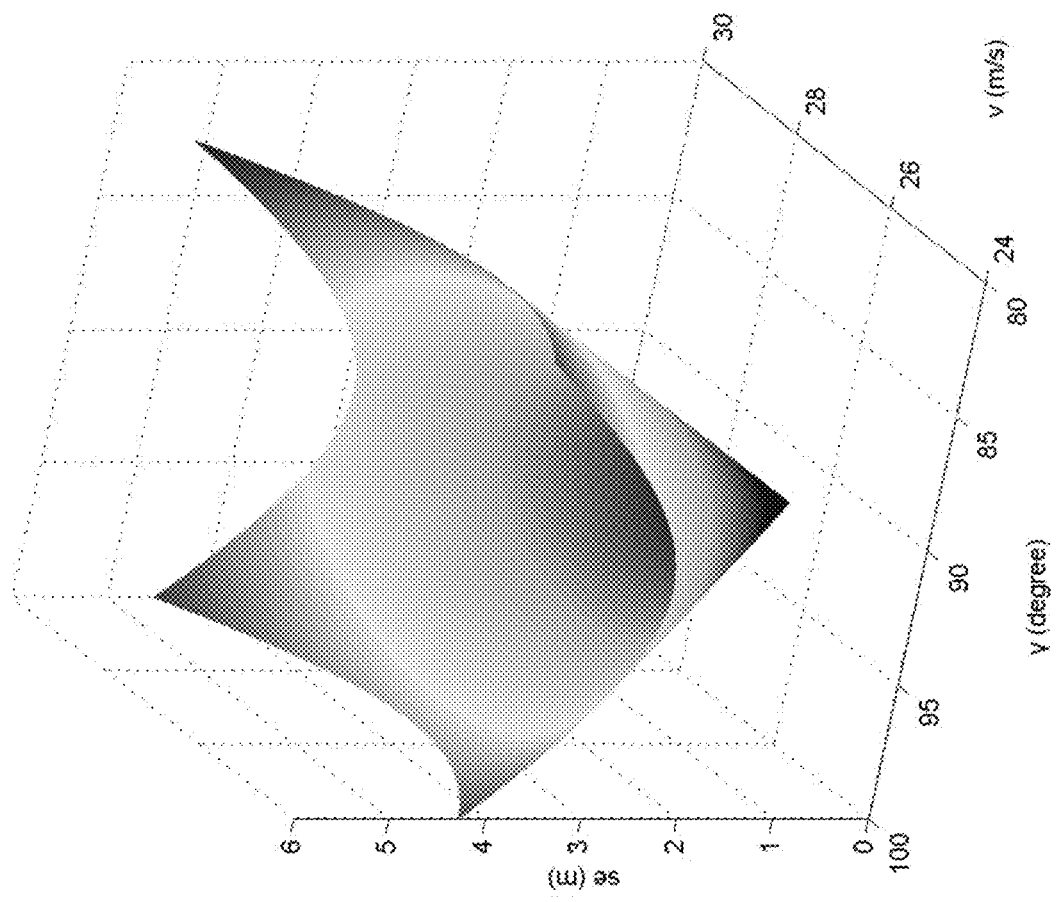
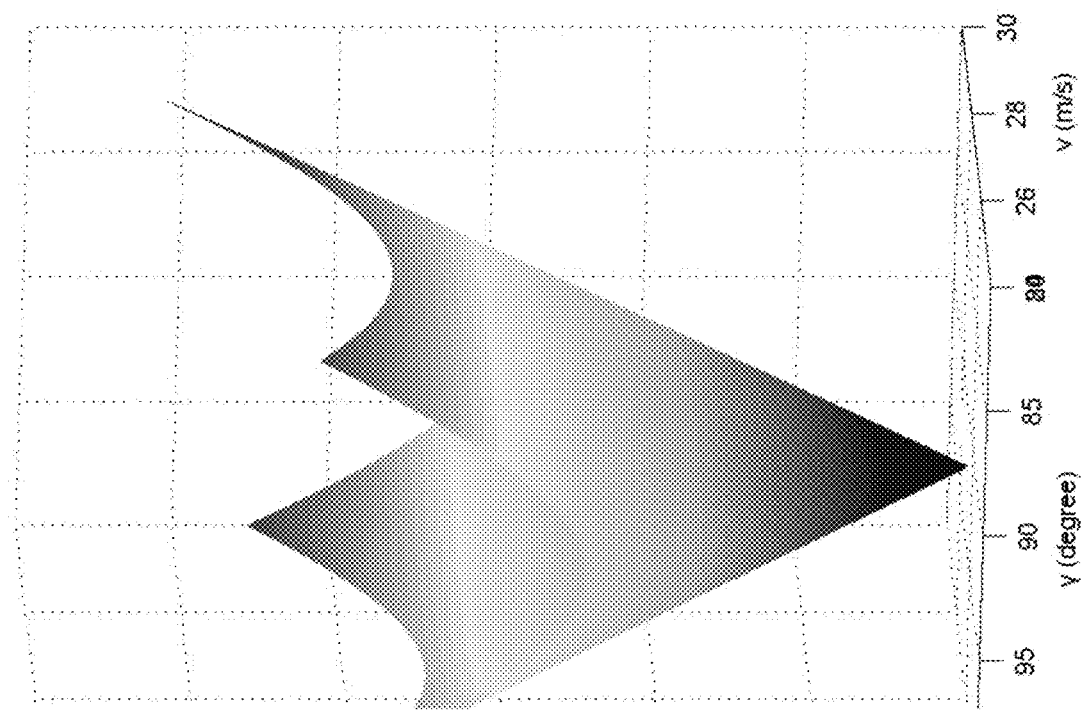
FIG. 17

(a) w = 1 m/s without shifting (b) w = 3 m/s without shifting (c) w = 5 m/s without shifting

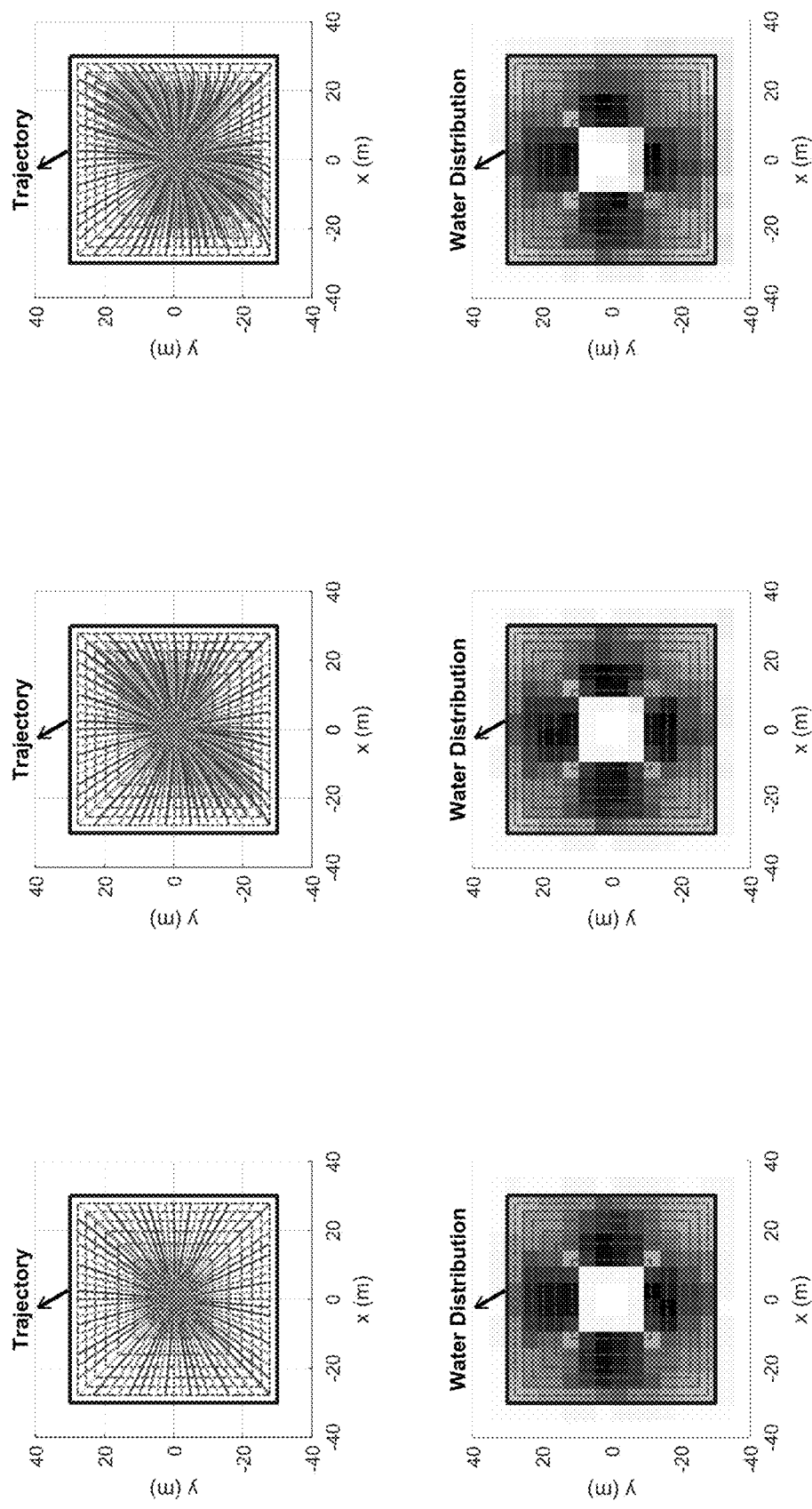

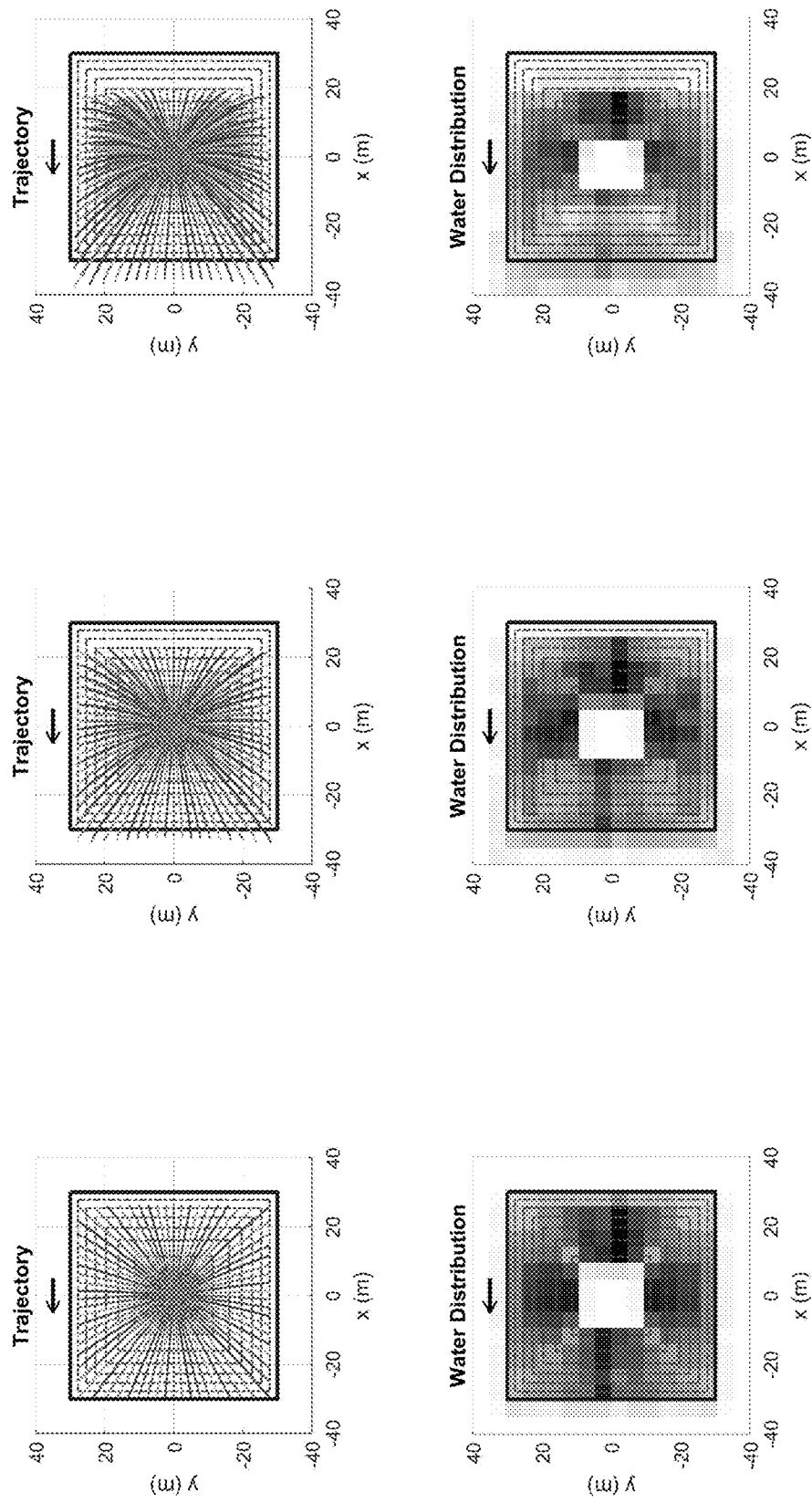

(d) w = 1 m/s with shifting (e) w = 3 m/s with shifting (f) w = 5 m/s with shifting

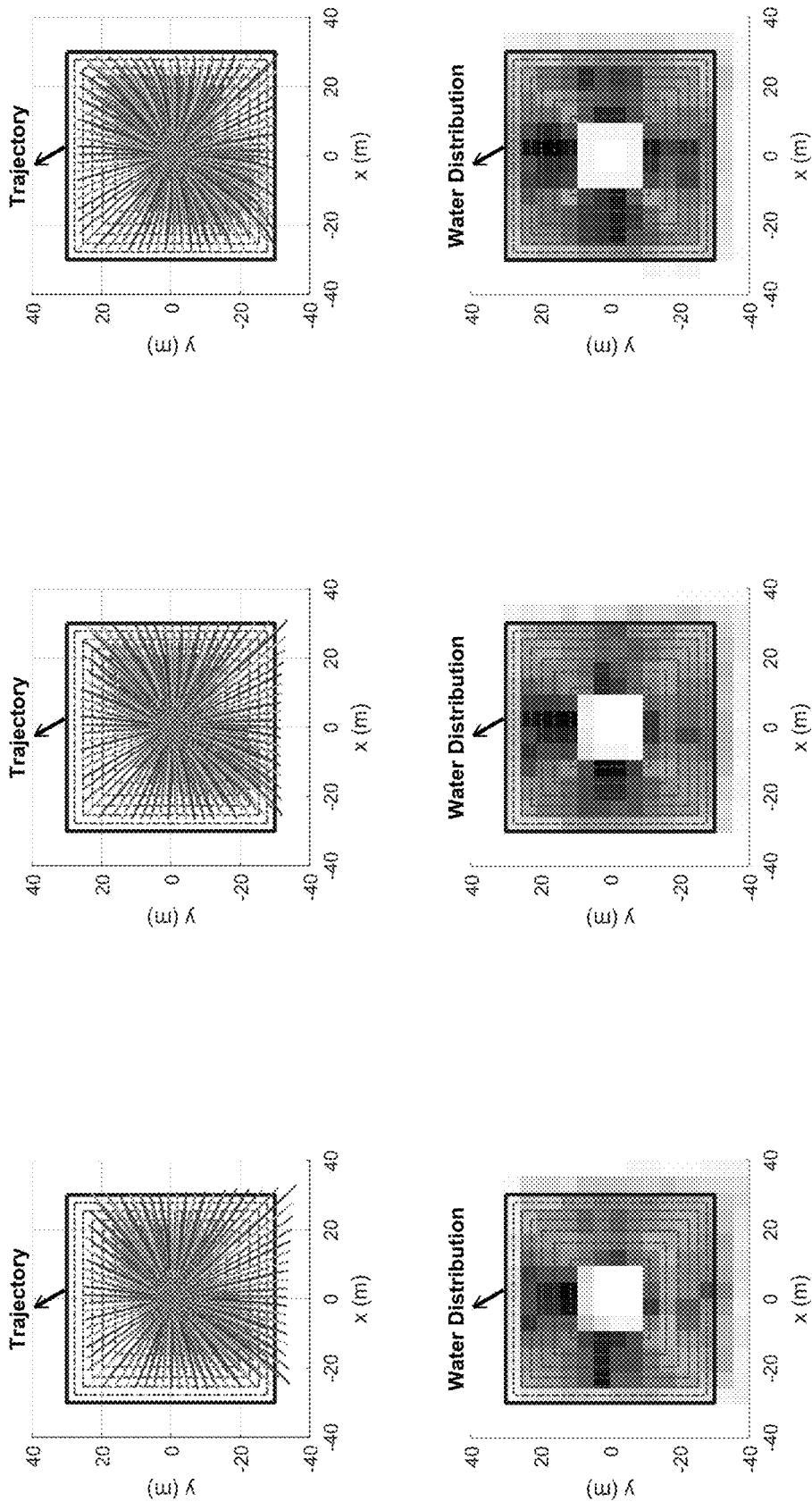
(a) $w_m = 5$ m/s, $w_a = 2$ m/s   FIG. 23A
(b) $w_m = 5$ m/s, $w_a = 3$ m/s   FIG. 23B
(c) $w_m = 5$ m/s, $w_a = 4$ m/s   FIG. 23C (d) $w_m = 5$ m/s, $w_a = 6$ m/s (e) $w_m = 5$ m/s, $w_a = 7$ m/s (f) $w_m = 5$ m/s, $w_a = 8$ m/s

FIG. 29

SPRINKLER SYSTEM ACCOUNTING FOR WIND EFFECT

CROSS-REFERENCE TO RELATED APPLICATIONS

This application is a divisional of U.S. patent application Ser. No. 16/491,495 having 371 national entry date of Sep. 5, 2019; which is a 371 national entry of PCT International Patent Application No. PCT/CA2017/000250 having international filing date of Nov. 24, 2017, which claims priority of Canadian patent application no. 2,949,767 filed on Nov. 28, 2016. All of the above applications are incorporated herein by reference.

FIELD OF THE INVENTION

This invention is directed to a sprinkler system, more specifically a sprinkler system coupled with a system aimed at minimizing the effect of wind during watering.

BACKGROUND OF THE INVENTION

Water resources are very important to humans and ecosystems. Only 2.5% of the Earth's water is freshwater, and of which 98.8% is in ice and groundwater, and less than 0.3% of all freshwater is in rivers, lakes, and the atmosphere. About 70% of the freshwater used by humans goes to irrigation and agriculture to ensure enough food is produced. In recent years, many developing countries are facing with water crisis. In the USA, the governor of California declared mandatory water restrictions last year aiming to reduce the urban water usage by 25% for the first time ever.

For obvious reasons and to make a contribution to the sustainable management of water resource, it is highly desirable for the irrigation and agriculture industry to find better ways to use water more efficiently. Currently most underground sprinkler systems are comprised of heads that can be adjusted for a fixed water flow rate resulting in a fixed radius coverage area. As the radius of coverage is constant through the spray pattern, multiple sprinkler heads must be used to provide complete lawn coverage. In order to provide proper water coverage with a fixed spray pattern, sprinkler manufacturers recommend "Head to Head Coverage" which requires multiple heads per area and results in overlapping watering patterns, creating substantial water wastage and loss.

Patent application WO2015157844 disclosed a new nozzle head design that allows a constantly variable flow throughout its rotation. The sprinkler heads taught are said to be capable of delivering uniform coverage such that the need for overlapping spray areas is eliminated, resulting in significant water savings as well as the saving in water pipe construction. The ability to have one adjustable flow head greatly simplifies installation by eliminating the need for multiple heads and piping normally required within a single area.

However, the installation and parameter setting of this kind of sprinkler system require a lot of effort and experience, and the ultimate performance including the water coverage and precipitation uniformity are unknown until a field test is conducted. On the other hand, the water coverage and uniformity are vulnerable to the effects of wind, the performance of any sprinkler system usually deteriorates quickly when it is exposed to wind.

Despite known sprinkler systems none have incorporated a system to take into account wind on the water being sprayed. The inventors of the present invention have developed a novel system to be coupled with a sprinkler system which greatly overcomes the wind effect on sprayed water under normal and reasonable watering conditions.

The inventors have developed a novel platform which can not only simulate and visualize the overall spraying process for complex lawn shape, but can also provide a solution to shift (minimize) the wind effect under various windy conditions. The platform can be used to facilitate the sprinkler system design, test system performance under windy condition, and generate the wind effect shifting database. The design started with mathematical modelling of droplet dynamic, the droplet movement from a nozzle was simulated.

SUMMARY OF THE INVENTION

According to an aspect of the present invention, there is provided a system for use in conjunction with at least one sprinkler, wherein said system comprises:
  a wind detector located proximate an area to be sprayed by the at least one sprinkler; said wind detector adapted to record and relay information relating to a wind;
  a processor adapted to receive said information obtained from said wind detector and capable of modifying a sprinkler spraying program to compensate for said wind; said processor is operatively connected to the at least one sprinkler.

Preferably, the information relating to a wind comprises: wind speed and wind direction.

According to a preferred embodiment, the processor further comprises instructions for manipulating the water output from said at least one sprinkler through incorporation of at least one algorithm used to calculate a value.

According to an aspect of the present invention, there is provided a system for use in conjunction with at least one sprinkler, wherein said system comprises:
  a wind detector located proximate an area to be sprayed by the at least one sprinkler; said wind detector adapted to record information relating to a wind comprising wind speed and wind direction;
  a processor adapted to receive said information to obtained from said wind detector and capable of modifying a sprinkler program to compensate for said wind; said processor is operatively connected to the at least one sprinkler; and comprising:
  computer coded instructions for manipulating the water output from said at least one sprinkler through incorporation of at least one windshifting algorithm used to calculate a value; and
  wherein said at least one windshifting algorithm using the information collected by the wind detector to yield a value corresponding to at least one instruction and providing said at least one instruction to the processor to modify a water output of the at least one sprinkler to counteract, in whole or in part, the effect of the wind.

Preferably, the wind detector is an anemometer. According to another preferred embodiment, the anemometer is a vane anemometer. Preferably also, the wind detector is adapted to wirelessly relay information to the processor.

According to a preferred embodiment, the processor receives the information from the wind detector and uses a pre-determined value corresponding to an instruction to modify the sprinkler spraying program. Preferably, the pre-determined value corresponding to an instruction is related to the information obtained from the wind detector.

According to a preferred embodiment, the wind detector is adapted to wirelessly relay information to the processor, wherein the processor further comprises a database for storing data representing values obtained through the performing of at least one algorithm, wherein said value is used for manipulating the water output from said at least one sprinkler.

Preferably, the sprinkler is of the single head rotary type.

According to a preferred embodiment, the system further comprising a manifold fluidly connected to a water supply via a flow control valve, wherein said manifold is operated by instructions from a controller. Preferably, the controller is a computer.

According to a preferred embodiment, the value calculated corresponds to at least one of: droplet diameter; spray speed; spray angle etc.

According to another aspect of the present invention, there is provided method of spraying an area requiring watering under windy conditions, wherein said method comprises:

- providing at least one sprinkler in fluid connection with a water source and adapted to spray said area according to a spraying program;
- providing at least one wind detector located proximate the area requiring watering;
- providing a processor adapted to receive information on a wind detected from the at least one wind detector and capable of modifying a spraying program based on the wind detected in order to counteract, in whole or in part, the effect of the wind on the water being sprayed;
- recording the wind information and sending the information to the processor;
- modifying the spraying program by providing at least one instruction to the processor operatively connected to the at least one sprinkler, said instruction being predetermined to counteract, in whole or in part, the effect of the wind.

Preferably, the method further comprises:

- at least one wind counteracting sprinkler fluidly connected to a water source and activated by the processor to perform the spraying program designed to counteract the wind effect.

Preferably also, said processor receives the information from the wind detector and uses a pre-determined value corresponding to an instruction to modify the sprinkler spraying program. Preferably, the pre-determined value corresponding to an instruction is related to the information obtained from the wind detector.

According to a preferred embodiment, the wind detector is adapted to wirelessly relay information to the processor, wherein the processor further comprises a database for storing data representing values obtained through the performing of at least one algorithm, wherein said value is used for manipulating the water output from said at least one sprinkler. Preferably, the method further comprises the use of at least one moisture sensor to evaluate the soil moisture and to evaluate water precipitation from a spraying program, wherein said moisture sensor is adapted to relay moisture information to the processor. Preferably also, the processor uses the moisture information in its algorithm to modify the spraying program.

BRIEF DESCRIPTION OF THE FIGURES

The invention may be more completely understood in consideration of the following description of various embodiments of the invention in connection with the accompanying figure, in which:

FIGS. 8A, 8B, 8C and 8D are graphical depictions of simulations for polygonal lawns;

FIGS. 9A through 9F are graphical depictions of the spraying effect in a three round spraying program;

FIGS. 12A through 12F are graphical depictions of a simulation spraying under windy conditions;

FIGS. 13A through 13F are graphical depictions of a simulation spraying under windy conditions under the mean diameter d=0.007 m;

FIGS. 14A through 14C are graphical depictions of cases 1, 2, and 3 which are simulation spraying under windy conditions where the droplet size is under the mean diameter d=0.007 m;

FIG. 17 is a 3D depiction of figure of se(v, y) under conditions: To=(Om, 25 m), w=1 m/s, =30°;

FIG. 18 is a schematic depiction of an adaptive step length algorithm to find a solution that meets the error requirements or reaches the hardware limitations of precisions;

FIG. 19 is a 3D depiction of the optimizing path of the algorithm with similar conditions being the same with FIG. 17;

FIG. 20 is a graphical depiction of the figure of the algorithm performance shown in Table 5;

FIG. 21A through 21F are graphical depictions of the wind effect with different wind velocities for wind from south to north with 30 degrees;

FIG. 22A through 22F are graphical depictions of the wind effect with different wind velocities for wind from east to west;

FIG. 23A through 23F are graphical depictions of a sensitivity test conducted;

FIG. 24 provide graphical depictions of an example using target distances set up at 0.9, 0.7, 0.4 (proportion) to cover a lawn;

FIG. 25 provide graphical depictions of an example of arithmetic progression method.

FIG. 26 is a graphical depiction of an example of n-divide method. Light lines denoting target distances, while darker lines denoting divider lines;

FIG. 27 is a graphical depiction of an example of the divider lines method;

FIG. 28 is a depiction of a generated database in the format of 3D matrix

Figure 29:
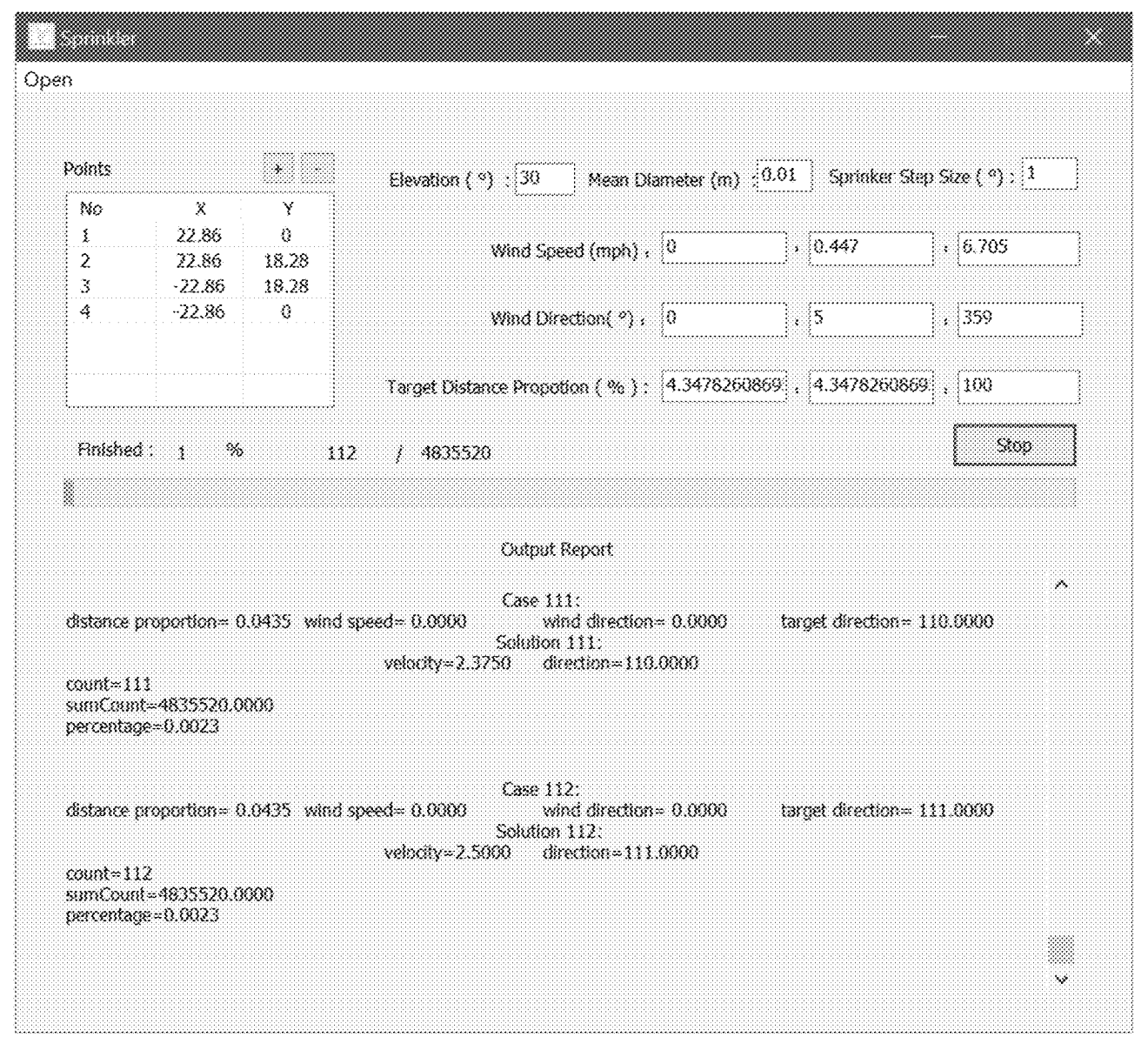

FIG. 29 is an example of a graphical user interface to generate the required database

DESCRIPTION OF A PREFERRED EMBODIMENT

Figure 1:
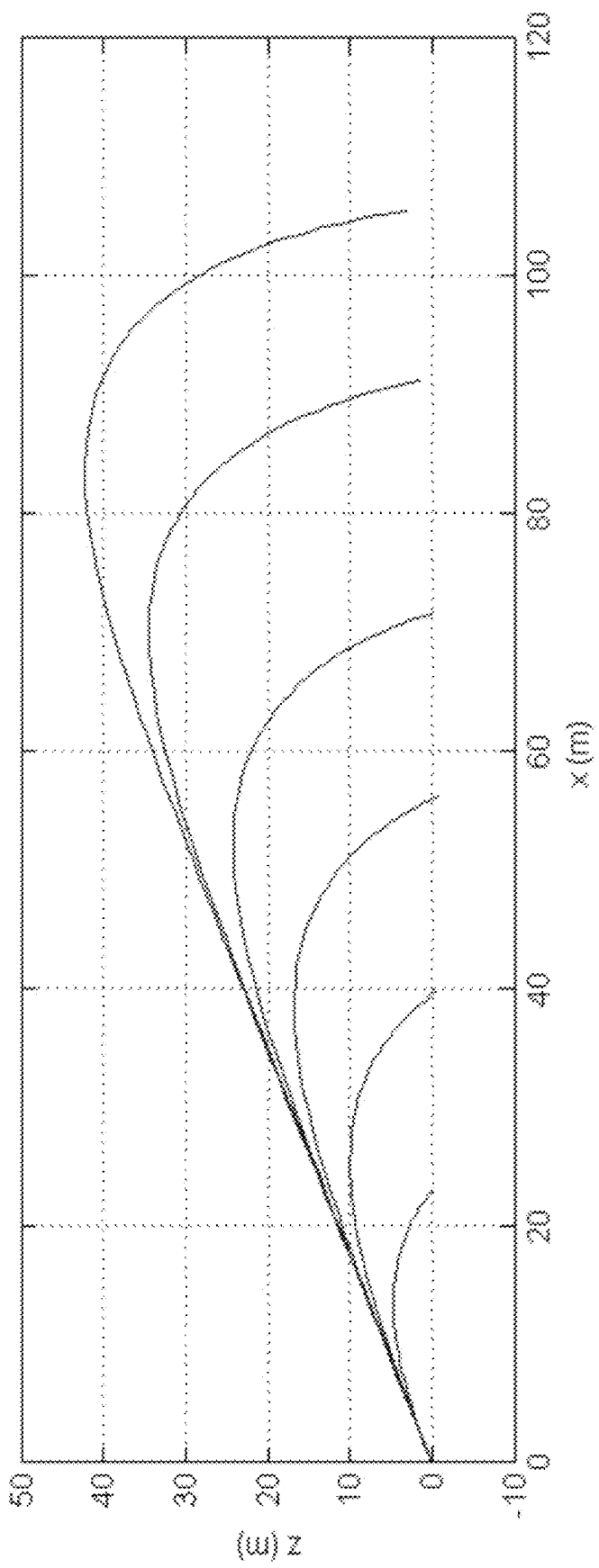
FIG. 1 is a graphical depiction of droplet trajectory with fixed diameter and different flow velocities.

The platform developed can be used to facilitate the sprinkler system design, test system performance under windy condition, and generate the wind effect shifting database. Starting with mathematical modelling of droplet dynamic, the droplet movement from a nozzle was simulated. The basic principle of the platform is illustrated in details accompanied by some simulation results. Particularly, the wind effect is studied by using the example of square lawn, and provide the shifting solution for different cases. A wind shifting algorithm is presented in details. Given the irrigation range, droplet distribution and wind condition, the proposed algorithm is capable to achieve optimal water coverage and uniform precipitation distribution by counteracting the wind effect.

Single Droplet Dynamic

The modelling of droplet dynamic has been studied by several authors. Lima (J. De Lima, P. Torfs, V. Singh, A mathematical model for evaluating the effect of wind on downward-spraying rainfall simulators, Catena 46 (4) (2002) 221-241.) investigated the mathematical model for a single droplet for a downward-spraying rainfall simulator.

Lorenzini (G. Lorenzini, Simplified modelling of sprinkler droplet dynamics, Biosystems Engineering 87 (1) (2004) 1-11.) proposed a simplified modelling for droplet dynamics without considering the wind effect.

Salvador (R. Salvador, C. Bautista-Capetillo, J. Burguete, N. Zapata, A. Serreta, E. Playa'n, A photographic method for drop characterization in agricultural sprinklers, Irrigation science 27 (4) (2009) 307-317.) proposed a photographic method to determine the droplet diameter.

Moita (R. D. Moita, H. A. Matos, C. Fernandes, C. P. Nunes, M. J. Pinho, Dynamic modelling and simulation of a heated brine spray system, Computers & Chemical Engineering 33 (8) (2009) 1323-1335.) investigated the dynamic modelling for a heated brine spraying system.

Conti (A. Conti, D. DeWrachien, G. Lorenzini, Computational fluid dynamics (cfd) picture of water droplet evaporation in air, Irrigation and Drainage Systems Engineering 2012) studied the water droplet evaporation in the air based on computational fluid dynamics.

To arrive at the platform designed, the following hypotheses were adopted: the forces applied to the system were weight and frication; the buoyancy was ignored; the evaporation was not considered; and the droplet keeps a spherical shape during the flight, thus its volume does not change.

In practice, the buoyancy has negligible effect to the droplet movement, thus was also neglected. The variables and parameters used in this study are listed in the following Table 1.

TABLE 1

| Symbols | Definition |
|---|---|
| $v_x$ | The velocity component in the X direction |
| $v_y$ | The velocity component in the Y direction |
| $v_z$ | The velocity component in the Z drection |
| $v_0$ | The initial Bow velocity of droplets from nozzle |
| $\alpha$ | The vertical spraying angle of nozzle |
| $\gamma$ | The horizontal spraying angle |
| $k$ | The drag coefficient |
| $m$ | The mass of a single droplet |
| $h$ | The initial height of nozzle |
| $d$ | The water droplet diameler |
| $p_w$ | The density of water |
| $p_a$ | The density of air |

TABLE 1-continued

| Symbols | Definition |
|---|---|
| $\psi$ | The Reynolds number of water droplets |
| $w$ | wind speed $w = [w_x, w_y, w_z]$ |
| $w_x$ | wind speed at x direction |
| $w_y$ | wind speed at y direction |
| $w_z$ | wind speed at z direction |
| $\beta$ | the angle between wind and x-axis |

With the assumptions above, and according to Newton's second law of motions, the mathematical model can be described as the following:

$$m\frac{dv_x}{dt} = -k(v_x - w_x)\sqrt{(v_x - w_x)^2 + (v_y - w_y)^2 + v_z^2} \qquad (1)$$

$$m\frac{dv_y}{dt} = -k(v_y - w_y)\sqrt{(v_x - w_x)^2 + (v_y - w_y)^2 + v_z^2} \qquad (2)$$

$$m\frac{dv_z}{dt} = -kv_z\sqrt{(v_x - w_x)^2 + (v_y - w_y)^2 + v_z^2} - mg. \qquad (3)$$

where the droplet mass m is defined as $$m = 4/3\pi r^3 = 1/6\pi d^3$$

and the drag friction coefficient is denoted by k which is given by k=ψρad2.

A fast numerical solver using Runge-Kutta methods is implemented in the platform to compute the solution for the system of nonlinear ordinary differential equations (ODE). In a sprinkler system, one of the most important characteristic is the size of droplet that the nozzle can generate. For a constant spraying velocity, the different droplet diameter can result on different spraying distance. Similarly, given a constant droplet diameter, the variant spraying velocity will generate variant spraying distance. Thus we begin with analyzing the relationship between the droplet diameter, spraying velocity and spraying distance by testing a 2D single droplet spraying case. Under the windless condition, in FIG. 1, the trajectory of a water droplet with fixed diameter d=0.01 m is illustrated for the range of flow speeds $v_o$=[25, 50, 100, 200, 500, 1000] m/s.

Based on the various calculations the droplet distance would only be increased by about 2 times, from 55 m to 105 m as the flow speed $v_o$ is increased from 100 m/s to 1000 m/s. The trajectory of a single droplet with fixed initial speed=120 m/s for droplet with diameter d=[0.002 0.004 0.008 0.016] m in FIG. 2 was plotted.

Figure 2:
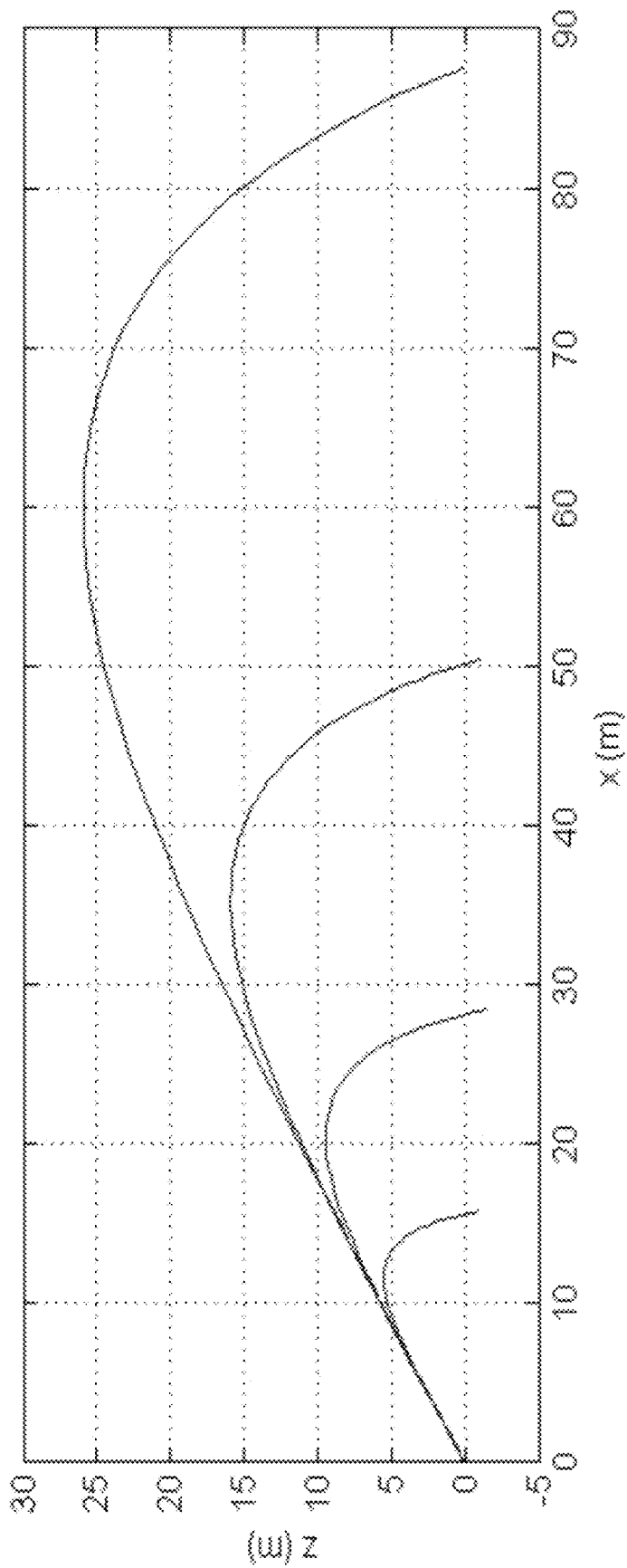
FIG. 2 is a graphical depiction of droplet trajectory with fixed velocity and different diameters.

From FIG. 2, it was noted that the droplet distance can be significantly increased by enlarging the droplet diameter. The droplet with d=0.01 m and $v_o$=1000 m/s has a similar performance with the droplet with d=0.016 m and $v_o$=120 m/s. Therefore, a sprinkler system with the nozzle that can generate large droplet more robust under the wind condition and easier to control in terms of wind shifting.

Figure 3:
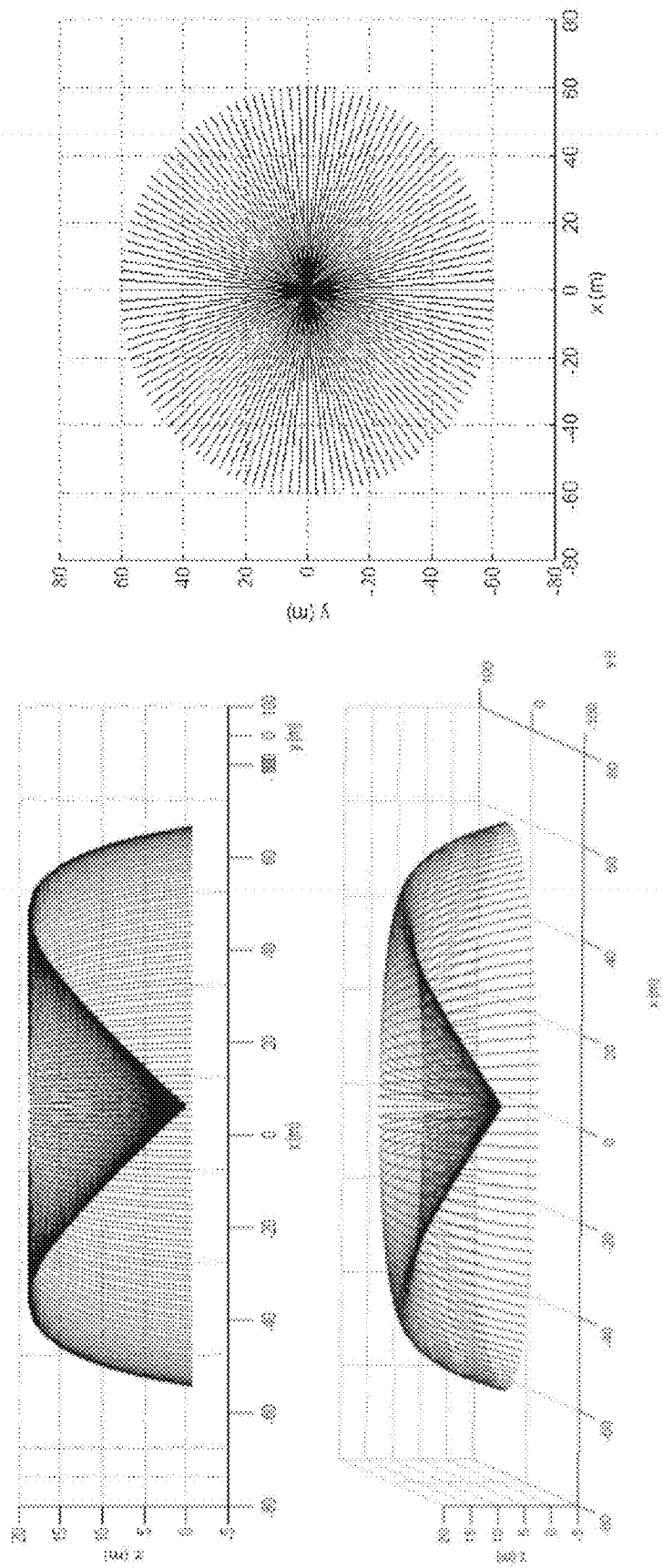
FIG. 3 is a graphical depiction of the spraying trajectory of the conventional sprinkler system.
Figure 4:
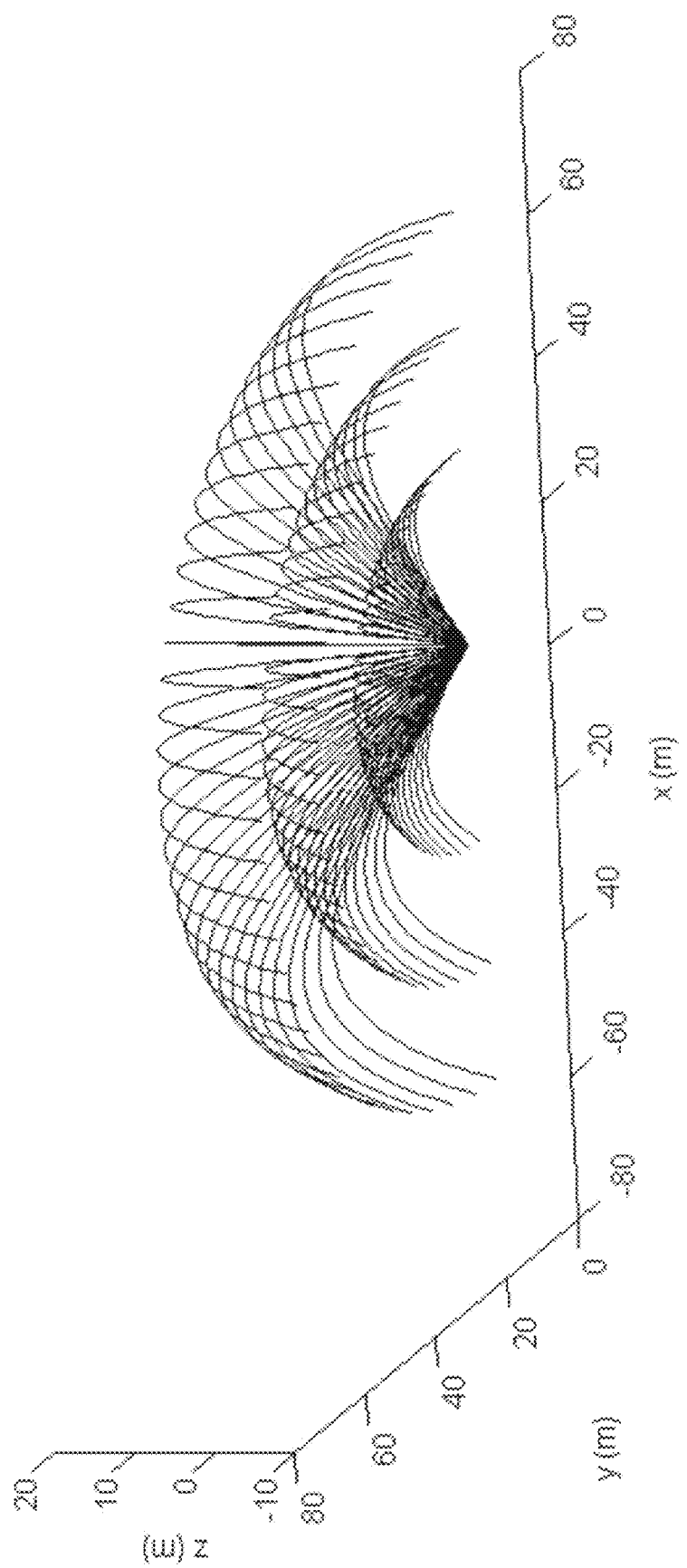
FIG. 4 is a graphical depiction of the spraying trajectory of the conventional sprinkler system with three sweeps.

Through the platform developed, it was possible to simulate a conventional sprinkler system with circular coverage. In FIG. 3, the spraying profile for the case with droplet d=0.01 m, $v_o$=120 m/s is displayed. In FIG. 4, the spraying process of semi-circle lawn with three round of sweeps is simulated.

Actually, besides the conventional sprinkler pattern, the proposed platform was determined to properly simulate the sprinkler system with more complicated design discussed in the next section.

Modelling of Intelligent Sprinkler System

Figure 5:
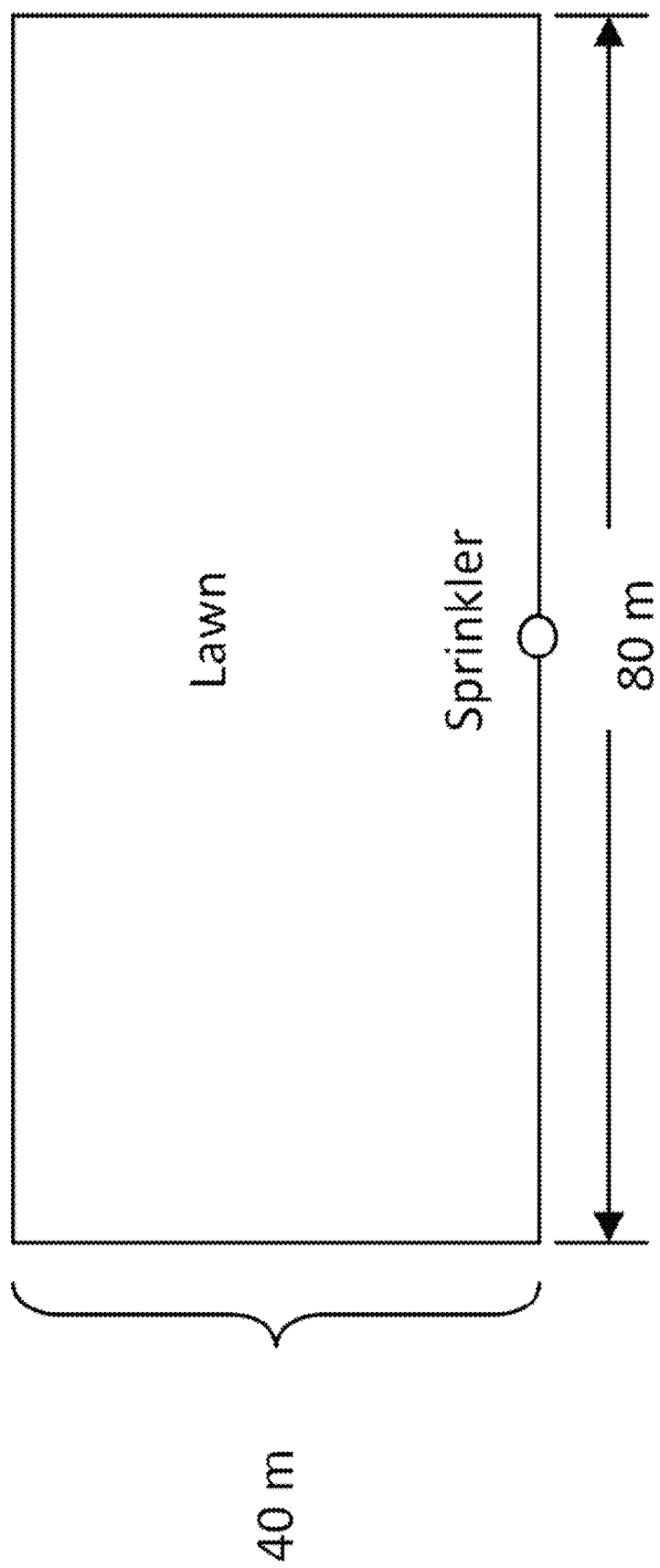
FIG. 5 shows a rectangular lawn with the dimension of 80 m×40 m with the positioning of a sprinkler.

The platform developed was shown to be capable of simulating a sprinkler system with the following features:
- the nozzle can continuously adjust its flow velocity at any angle;
- the system is able to detect the real time wind condition;
- the system has sufficient computing power to implement the wind shifting algorithm With these features, it is clear that the intelligent sprinkler system according to an embodiment of the present invention is superior to a conventional sprinkler system in terms of the following aspects:
- the water spray of intelligent sprinkler can perfectly cover lawn with any shape, since the flow velocity can adjust with the angle;
- the intelligent sprinkler system can automatically calculate the pull back amount according to the user custom setting, such that a good water distribution uniformity can be achieved;
- the sprinkler system is capable to counteract the wind effect to achieve good coverage and uniformity under various wind conditions As an illustration, assuming a rectangular lawn with the dimension of 80 m×40 m, where the nozzle is placed on the boundary of the lawn as shown in FIG. 5, the elevation angle of the nozzle is set as 30 degree.

The basic idea to achieve optimum water coverage is that first the rectangular area is divided into n pies, where n is a user-defined value, then for each pie, the required velocity is computed such that the spray precisely reach the target distance. To just cover the shape of the lawn, the target distances are just the boundary of the lawn. As would be clear to the person skilled in the art, the target distances are determined by the contour of the lawn. To find the accurate required flow velocity to reach certain target distance, the characteristic curve is used. The characteristic curve is a function that provides the information regarding the spraying distance vs initial flow velocity for droplet at certain diameter. Once the droplet diameter is selected and the elevation angle, the characteristic curve is determined. The characteristic curve for the droplet with d=0.01 m is shown in FIG. 6.

Figure 6:
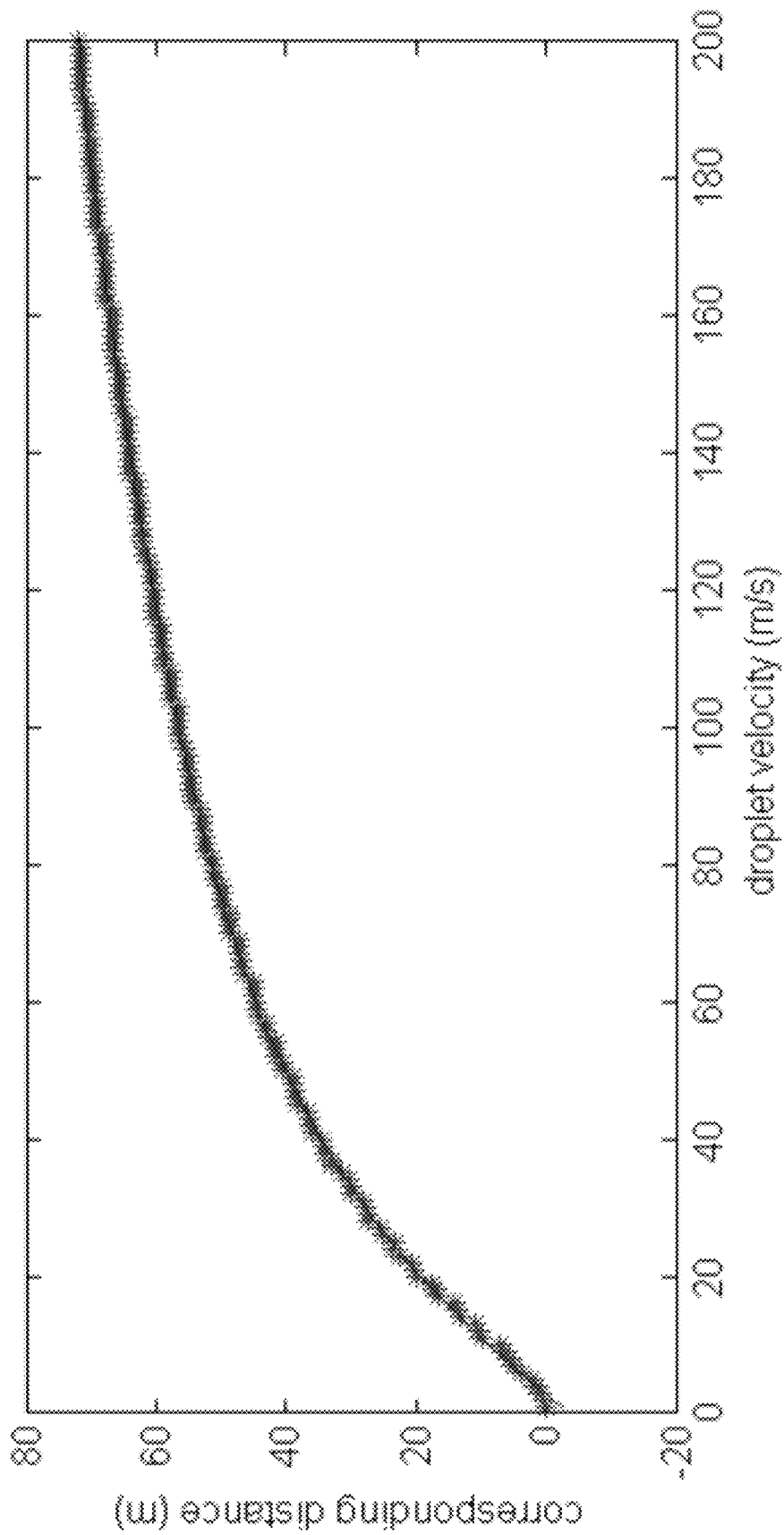
FIG. 6 is a graphical depiction of a characteristic curve of the droplet with the droplet diameter=0.01 m.
Figure 7A:
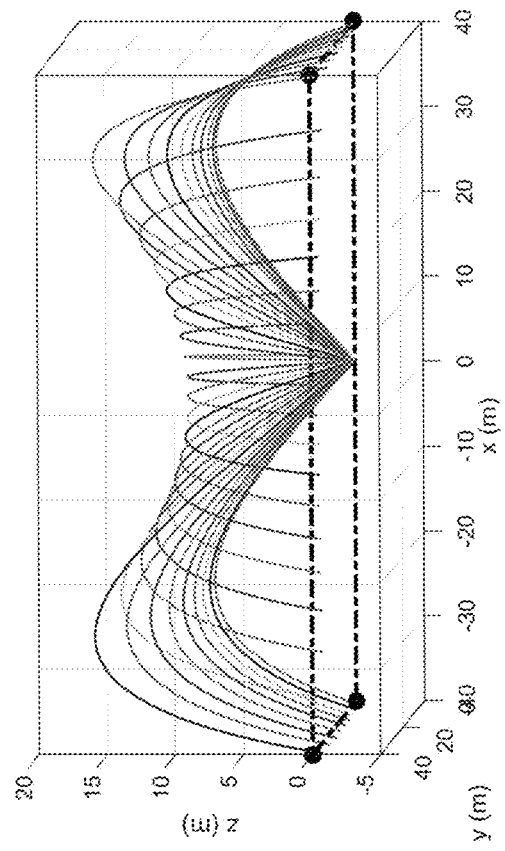
FIGS. 7A, 7B and 7C are graphical depictions of a simulation for a rectangular lawn.
Figure 7B:
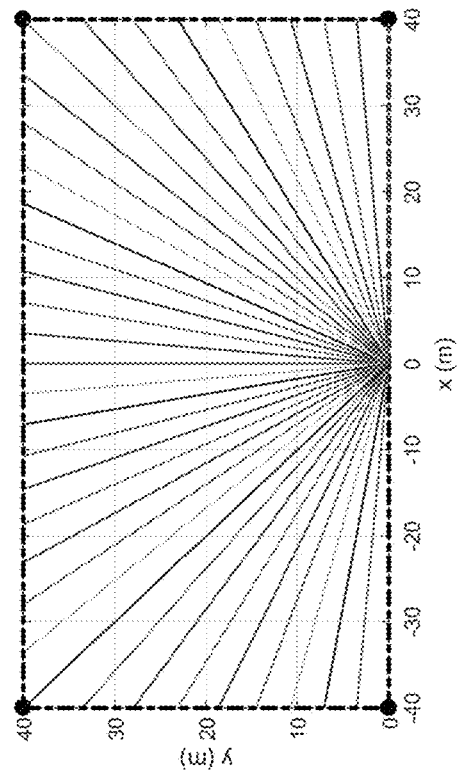
Figure 7C:
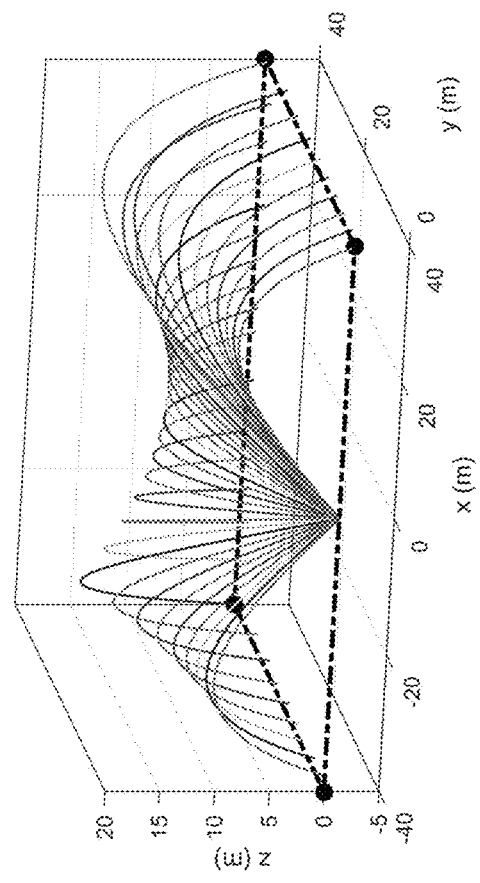

The x and y axis in FIG. 6 denote the droplet velocity and corresponding spraying distance, it indicates that for the droplet with d=0.01 m, given the initial flow velocity, what is the corresponding spraying distance. Note that the dots in FIG. 6 are resulted from the numerical solution, and a 4th order polynomial interpolation is employed to find the continuous characteristic curve. By using the generated characteristic curve, the required flow velocity can be computed for the given the lawn in FIG. 5. For example, according to the characteristic curve in FIG. 6, to reach the target distance 40 m, the required initial flow velocity should be around 50 m/s. Using the solver to find the roots for the polynomial, the exact required flow velocity can be found.

In fact, for a typical sprinkler system, the spray generated by the nozzle contains droplets with various diameters.

Besides the conventional rectangle lawn, the platform is capable of simulating sophisticated spraying process for lawn with more complex contours. In any case, the location of the sprinkler can be selected to be either inside the lawn perimeter or on the boundary of the lawn.

FIG. 8 reports a spraying process for triangular and pentagonal lawns, where the nozzle is placed inside the lawn.

By assigning multiple target distances to the sprinkler system, and let each target distance keep same proportion at each angle, the multiple round spraying process can be simulated. As shown in FIG. 9, the proportion selected is [1.0, 0.75, 0.5], such that the resulting target distances are [40, 30, 20] m respectively.

Conventionally, the spraying process, is from outer round to inner round, and the distance between each round is called pull back amount. For the simulation process conducted and reported in FIG. 9 was carried out from inner round to outer round in order to achieve a better visualization effect. The speed at which the sprinkler head rotates can be adjusted by the control system. The wind shift algorithm can calculate the sprinkler head rotational speed and optimize it to produce the correct distribution density. Rotational speed can be adjusted by each degree in the control system. Adjustable speed allows the sprinkler head to rotate slower and increase the precipitation rate in selected areas or allow the sprinkler head to rotate faster and decrease the precipitation rate in other selected areas.

The platform provides a high degree of freedom to the users, and most variables in the simulation process can be set by users via a Graphical User Interface.

Estimate of the Precipitation Distribution

Figure 10:
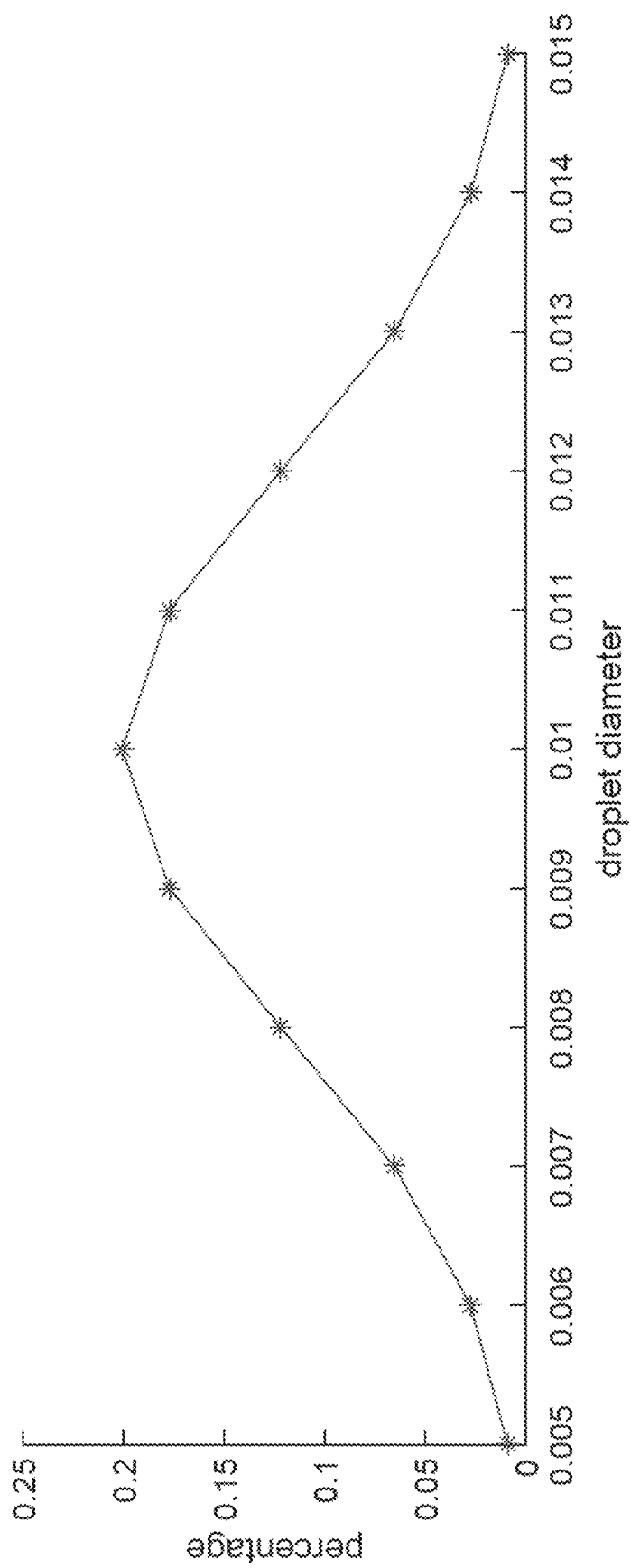
FIG. 10 is a graphical depiction of droplet diameter distribution.

The spraying process simulation described previously is based on droplet with a constant diameter. In reality, the spray jetted from nozzle consists of hundreds of thousands of droplets, and the diameters of these droplets are different. Therefore, to estimate the overall precipitation distribution, the estimate of droplet diameter distribution is needed. Given a certain droplet diameter distribution, the spraying pattern of droplets with various diameters can be computed, such that the corresponding water volume can be estimated. Obviously, the droplet diameter distribution is an important characteristic of the nozzle, and for given nozzle, its diameter distribution can be obtained from field test or experiments. As a general assumption of the droplet diameter distribution, the normal distribution is used in the following work. According to the definition, the percentage of droplet with certain diameter in terms of total water volume is given by $$f(d|\mu, \sigma) = \frac{1}{\sigma\sqrt{2\pi}} e^{-\frac{(d-\mu)^2}{2\sigma^2}}$$

where $\mu$ is the mean value of the droplet, $\sigma$ is the variance of the droplet. Let x axis be the droplet diameter, and y axis denotes the water volume percentage, then the droplet diameter distribution with mean diameter $\mu$=0.01 m and standard deviation $\sigma$=0.002 m is given in FIG. 10.

Assuming the water volume used in each sweep is C, then the total water volume of droplet with the diameter d is given by $$N(d)=C*f(d|\mu,\sigma).$$

Figure 11:
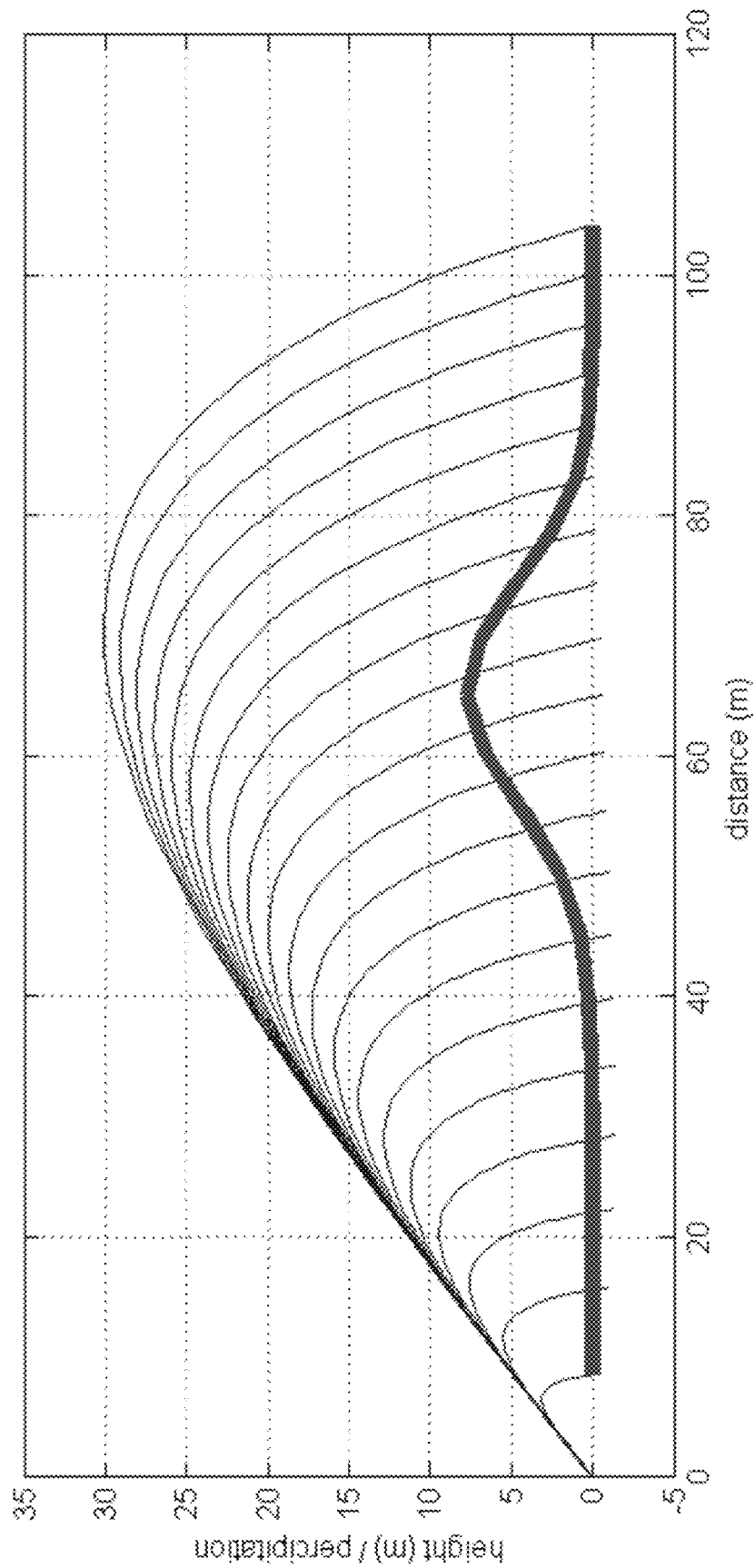
FIG. 11 is a graphical depiction of a 1D water distribution with normally distributed droplet diameter assumption.
Figures 13D, 13E, 13F:
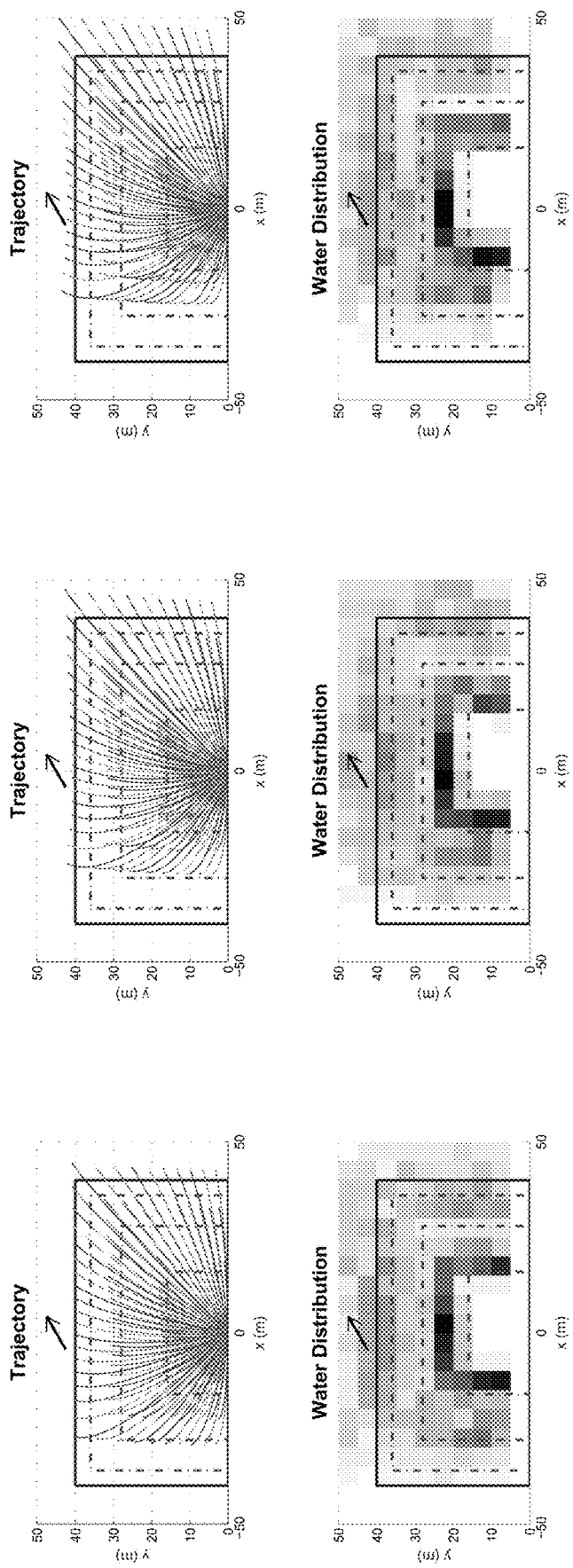

If the mean droplet diameter is p=0.01 m, $\sigma$=0.002 m, and the range of the droplet diameter is [0.001, 0.002, . . . , 0.019, 0.020] m, then the droplet trajectory of the droplet with each diameter is denoted by the light narrow lines in FIG. 11, and with the assumption of normal distributed droplet diameter, the precipitation distribution of one spray at a fixed direction is denoted by the bold dark line in FIG. 11.

Considering now the precipitation distribution result can be effectively estimated. In FIG. 9, a multi-round spraying process was simulated, where the pull back amounts between each round were the same. In practice, the pull back amount is not fixed the determination of the pull back amount, experimental results or empirical methods can be applied.

Considering the wide range of the droplet diameter distribution, the selection to find the required flow velocities and corresponding angles was based on the mean droplet diameter, thus the choice of target distance was very important for achieving a uniform precipitation distribution.

Preferably, the system provides an algorithm called divider lines method to automatically compute the optimal pull back amount for given number of pull back. All the boundary lines in the following simulations were computed by the divider lines method.

Wind Effect Simulation Results

Considering the wind effect is now incorporated into the simulation. Consider the lawn of FIG. 5, the characteristic curve described above can be used to find the required flow velocity to reach the target distance under the windless condition. If these computed flow velocity under a windy condition are used, then the wind effect can be simulated.

In the first wind effect simulation the wind is from west to east having an angle of 30 degree between wind direction x-axis. FIG. 12 reports the simulation of overall spraying with the droplet range from 0.001 m to 0.015 m with mean diameter 0.010 m; FIG. 13 reports a simulation of overall spraying with the same droplet range 0.001 m to 0.015 m with mean diameter 0.007 m. Six passes are applied as indicated by the boundary lines. The pull back amount between each red line is determined by the algorithm.

For the simulation results in FIGS. 12 and 13, the upper parts depict the droplet trajectory and the lower parts are the precipitation distribution. To quantify the uniformity of water distribution, one must define MeanSquareError (MSE) and Entropy. First, the original lawn is divided into several 5 m×5 m blocks and the water volume is measured in each block. Then the MSE is defined as following:

$$mse = \frac{1}{n}\sum_{i=1}^{n}(p_i - target_i)^2, \tag{4}$$

where i denotes all the blocks within and outside the lawn, and $target_i$ is defined as 5, $$target_i = \begin{cases} 0 \text{ block } i \text{ is outside the lawn} \\ \frac{1}{n} \text{ block } i \text{ is within the lawn} \end{cases} \tag{5}$$

Obviously, the MSE measures not only the uniformity inside the lawn, but also the water wasted outside the lawn. It is well known that the entropy can be used to measure the amount of order or disorder of a system, the higher the entropy of a system, the more ordered the system is. A person skilled in the art will understand that for the precipitation case, the higher the entropy after he spraying, the more uniform the lawn is. The Entropy is defined as 6:

$$\text{entropy} = \sum_{i=1}^{n} -p_i \ln(p_i). \tag{6}$$

where i denotes all the blocks within the lawn, pi is the water proportion in block i. By using MSE and entropy, the wind effect shown in FIGS. 12 and 13 can be quantified as was done in Table 2 below.

TABLE 2

| Droplet mean diameter $d_{mean}$ = 0.01 m | | | | | | |
|---|---|---|---|---|---|---|
| Wind speed (m/s) | 0 | 1 | 2 | 3 | 4 | 5 |
| MSE (×10$^{-3}$) | 5.07 | 5.31 | 6.99 | 8.05 | 9.20 | 9.41 |
| Entropy | 4.57 | 4.53 | 4.44 | 4.39 | 4.34 | 4.32 |
| Droplet mean diameter $d_{mean}$ = 0.007 m | | | | | | |
| Wind speed (m/s) | 0 | 1 | 2 | 3 | 4 | 5 |
| MSE (×10$^{-3}$) | 2.98 | 5.03 | 4.58 | 5.31 | 5.52 | 6.65 |
| Entropy | 4.67 | 4.57 | 4.58 | 4.55 | 4.53 | 4.45 |

From Table 2, it can be seen that as the wind speed increase, the MSE increases and Entropy decreases, showing the wind effect severity from MSE and Entropy aspects. As mentioned before, the proposed platform provides a big degree of freedom for the simulation. In FIGS. 14A through 14C, the wind effect is investigated and the simulation results of the three cases are reported. The three cases simulated are the following:

Case 1: The wind is from west to east with linearly increasing wind speed from 0 to 5 m/s Case 2: The wind is from south to north at first 180 degree with w=5 m/s, and then become from east to west at another 180 degree with w=3 m/s Case 3: The wind is from west to east, and wind speed has the form of sin(13), where the beta is the spraying angle FIG. 14 confirms that the platform is sufficiently flexible and accurate to simulate various wind effect cases. The wind effect can be effectively quantified by MSE and Entropy, and it is concluded that the wind effect significantly deteriorates the precipitation uniformity as well as water coverage, causing the increase of MSE and decrease of Entropy. The wind effect cause significant water wastage in the lawn irrigation.

Wind Shifting Algorithm and Simulation

To introduce the idea of wind shifting technology, one considers the lawn in the shape of square as in FIG. 15, where the nozzle is placed at the center of the lawn:

Assuming a fixed flow velocity=55 m/s, the spray can accurately reach the lower right corner from the center under the windless condition. Assuming there are five different wind conditions, where the wind speed w=4.92 m/s, and the wind directions are indicated by arrows in FIG. 16, then the wind effect is listed in the second column of Table 3, and to counteract the wind effect, the corresponding solution is listed in the last column of Table 3. The results after the shifting are reported in FIG. 16.

TABLE 3

| Case No. | Wind direction | Wind effect | Counteraction solution |
|---|---|---|---|
| 1 | Southeast to Northwest | Decelerate the droplet velocity in both directions | Increase flow velocity from 55 m/s to 118.25 m/s |
| 2 | Northwest to Southeast | Accelerate the droplet velocity in both directions | Reduce flow velocity from 55 m/s to 38.5 m/s |
| 3 | West to East | Reduce the flow velocity in x-direction | Increase flow velocity from 55 m/s to 92.4 m/s Change the spraying angle from $\frac{7\pi}{4}$ to $\frac{7.24\pi}{4}$ |
| 4 | East to West | Accelerate the flow velocity in y-direction | Increase flow velocity from 55 m/s to 41.25 m/s Increase the spraying angle from $\frac{7\pi}{4}$ to $\frac{6.80\pi}{4}$ |
| 5 | Northeast to Southwest | Accelerate the flow velocity in y-direction Decelerate the flow velocity in x-direction | Increase flow velocity from 55 m/s to 59.4 m/s Increase the spraying angle from $\frac{7\pi}{4}$ to $\frac{7.32\pi}{4}$ |

Figure 16:
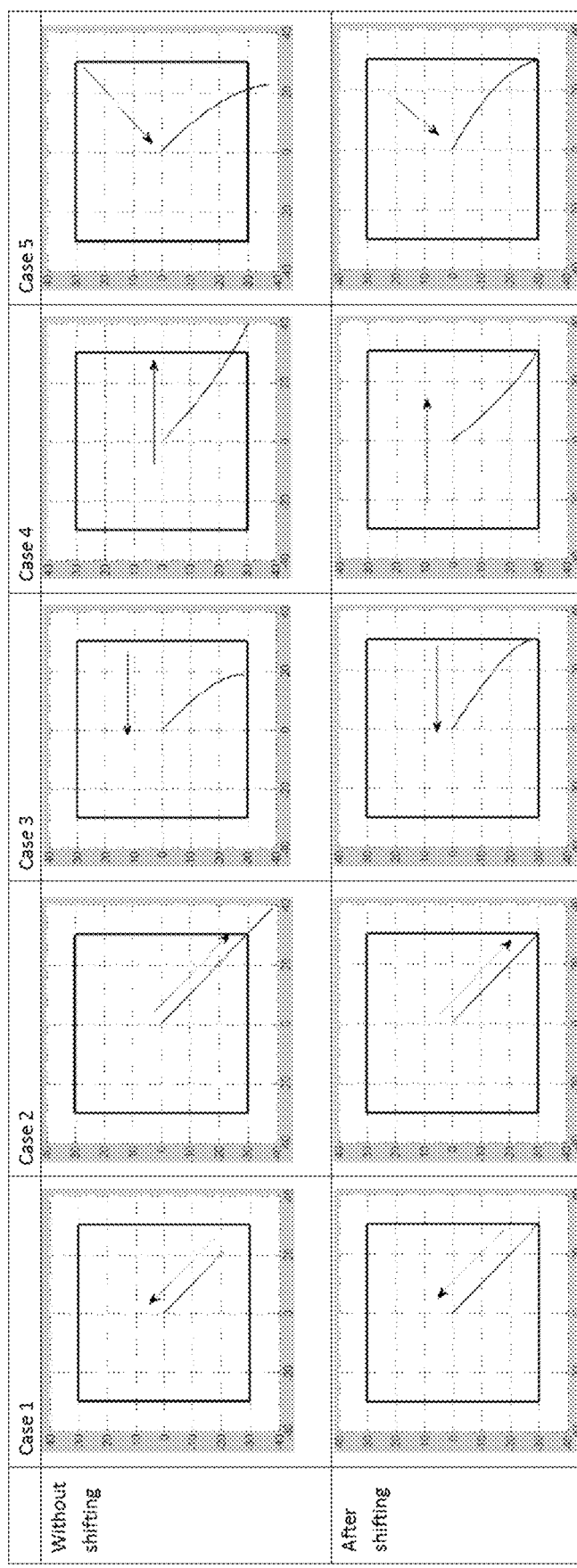
FIG. 16 is a graphical depiction of the wind shifting results for the 5 cases listed in Table 3;

By using the counteraction solutions in Table 3, the wind effect can be quite effectively counteracted as shown in FIG. 16.

In the next section we will illustrate how to find the required flow velocity as well as corresponding angles under the wind conditions.

Algorithms

Denoting the target spraying distance as $T_o$. According to the algorithm in the previous section, the required velocity $v_o$ and spraying angle $v_o$ without wind can be computed from the lawn contour information. To counteract the wind effect, the optimal flow velocity and angle are studied as the following:

$$v^i = v^{i-1} + \Delta v^{i-1} \quad (7)$$

$$\gamma^i = \gamma^{i-1} + \Delta \gamma^{i-1}, \quad i=1,2,\ldots \quad (8)$$

where $\Delta \gamma^{i-1}$ and $\Delta v^{i-1}$ are the searching step size of flow speed and angle, $v^i$ and $y^i$ are the updated speed and angle after $i^{th}$ correction. To find the appropriate v and y such that the wind effect can be efficiently counteracted, define the actual dropping point of droplet after $i^{th}$ correction as $T(v^i, y^i)$, then the spraying error SE after $n^{th}$ correction can be defined as the distance between $T(v^n, y^n)$ and $T_0$:

$$SE(v^i, \gamma^i) = (T_x(v^i, \gamma^i) - T_{0x})^2 + (T_y(v^i, \gamma^i) - T_{0y})^2 \quad (9)$$

Under wind speed w and wind direction $\beta$, the appropriate velocity and angle can be found by minimizing the target function (9) until the error se is less than user custom threshold value.

Figure 15:
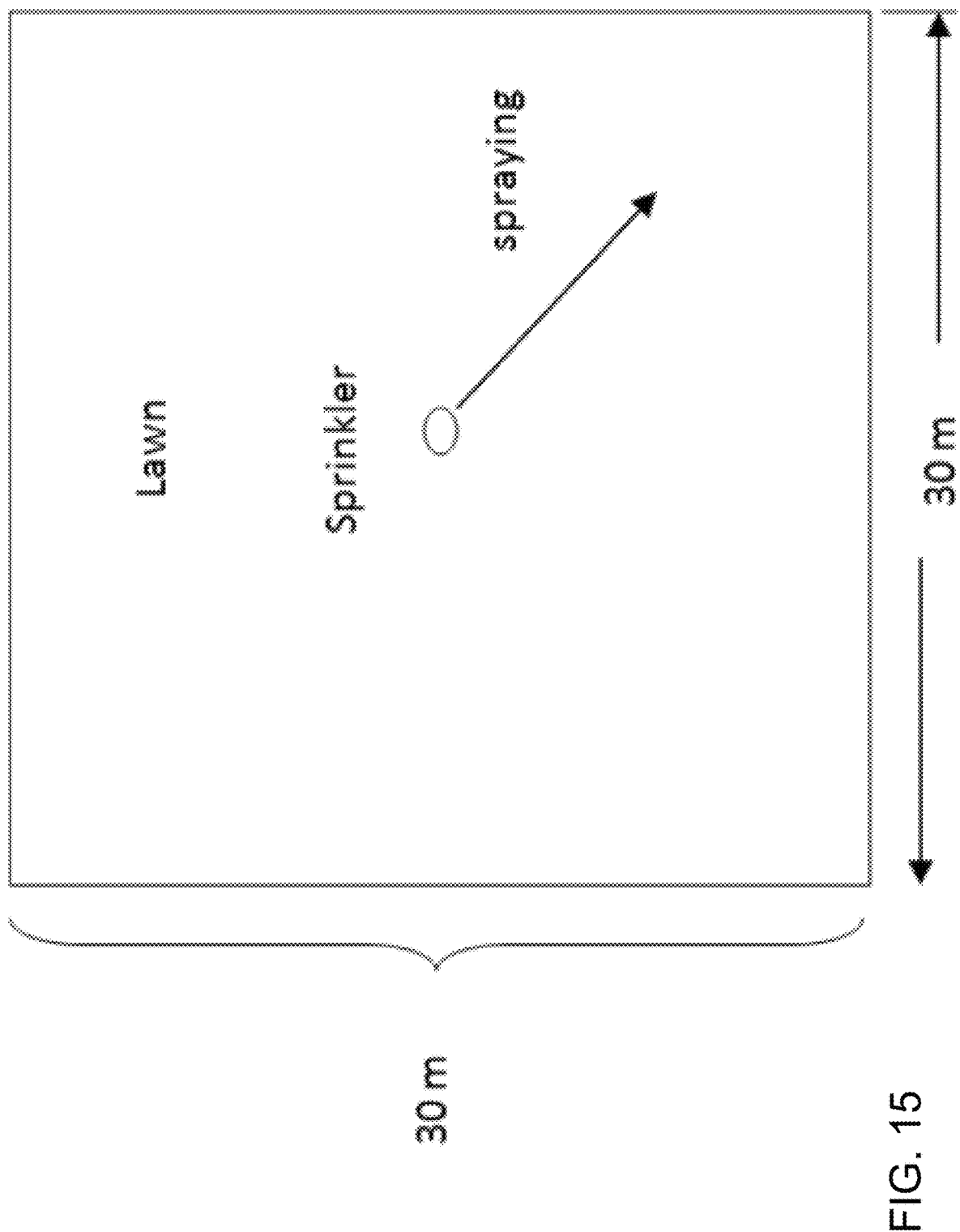
FIG. 15 shows of a lawn with dimension 30 m×30 m with a sprinkler positioned in its center.

FIG. 17 shows an error distribution for the lawn in FIG. 15, where the x, y and z coordinates correspond to spraying velocity, spraying angle, and error respectively. According to FIG. 17, it is clear that the error function has a global minimum, such that the method of traversal can be used to find out the optimal solution. Table 4 displays the minimum spray errors under the different precisions (searching step size).

FIG. 17. The 3-D figure of se(v,y) under conditions: $T_0$=(0 m,25 m), w=1 m/s, $\beta$=30°

TABLE 4

| v precision (m/x) | γ precision (°) | optimal solution (m/s, °) | spray error (cm) |
|---|---|---|---|
| $prs_v$ = 5.00000000 | $pra_\gamma$ = 10.00000000 | v = 25.00000000, γ = 90.00000000 | se = 172.209 |
| $prs_v$ = 2.50000000 | $prs_\gamma$ = 5.00000000 | v = 27.50000000, γ = 90.00000000 | se = 113.986 |
| $prs_v$ = 1.25000000 | $prs_\gamma$ = 2.50000000 | v = 26.25000000, γ = 92.50000000 | se = 48.912 |
| $prs_v$ = 0.62500000 | $prs_\gamma$ = 1.25000000 | v = 26.87500000, γ = 92.50000000 | se = 30.527 |
| $prs_v$ = 0.31250000 | $prs_\gamma$ = 9.62500000 | v = 26.56250000, γ = 91.87500000 | se = 11.954 |
| $prs_v$ = 0.15625000 | $prs_\gamma$ = 0.31250000 | v = 26.71875000, γ = 91.87500000 | se = 3.381 |
| $prs_v$ = 0.07812500 | $prs_\gamma$ = 0 15625000 | v = 26.71875000, γ = 91.37500000 | se = 3.381 |
| $prs_v$ = 0.03906250 | $prs_\gamma$ = 0.907812500 | v = 26.67968750, γ = 91 87500000 | se = 0.767 |
| $prs_v$ = 0.01953125 | $prs_\gamma$ = 0.03906250 | v = 26.67968750, γ = 91.87500000 | se = 0.767 |
| $prs_v$ = 0.00976563 | $prs_\gamma$ = 0.01953125 | v = 26.67968750, γ = 91.89453125 | se = 0.347 |

Although an optimal solution can be reached by a method of traversal under a specified precision, it's time-consuming and impossible to provide a real-time result on an embedded sprinkler system.

Figure 18:
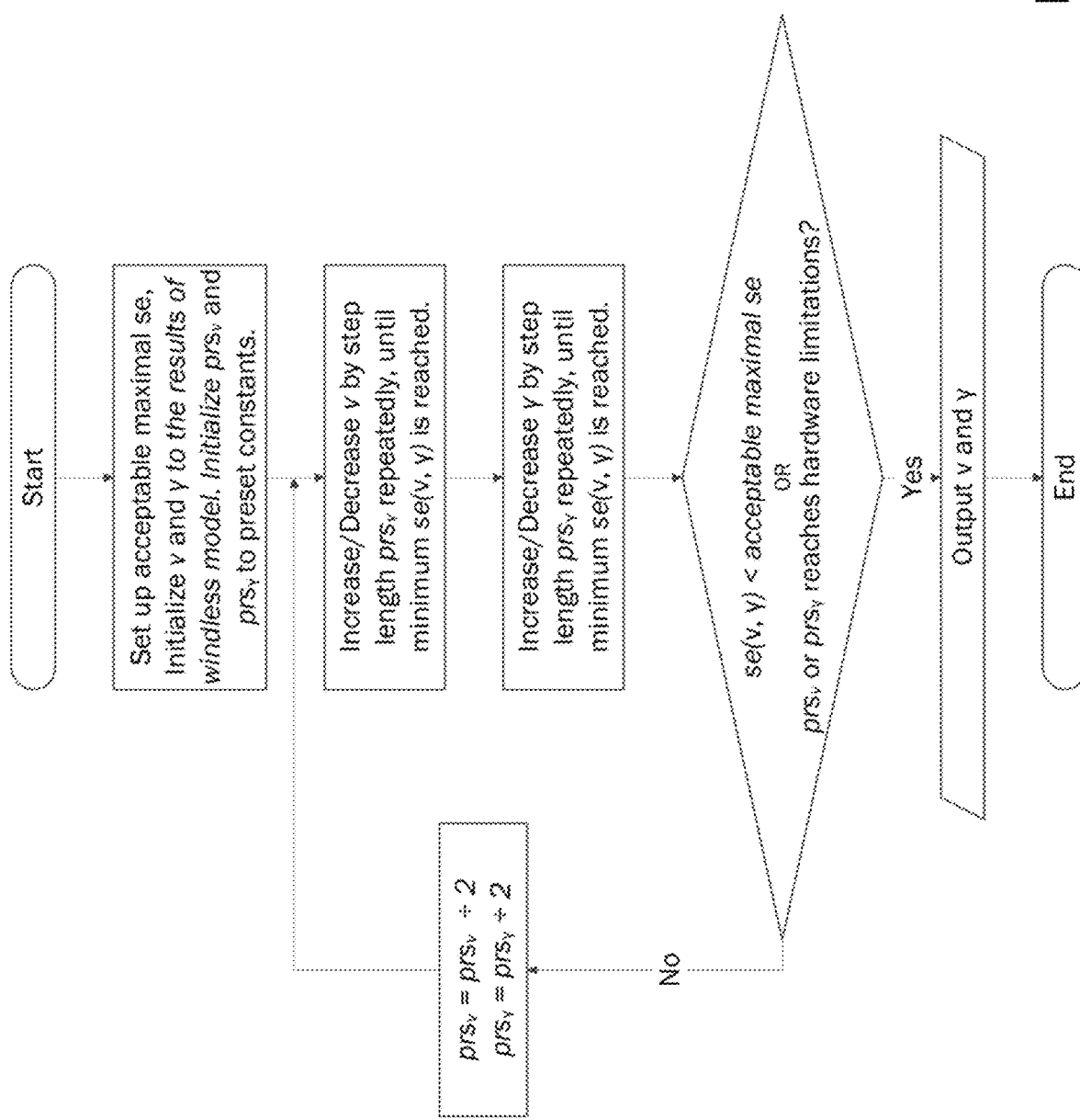
Figure 19:
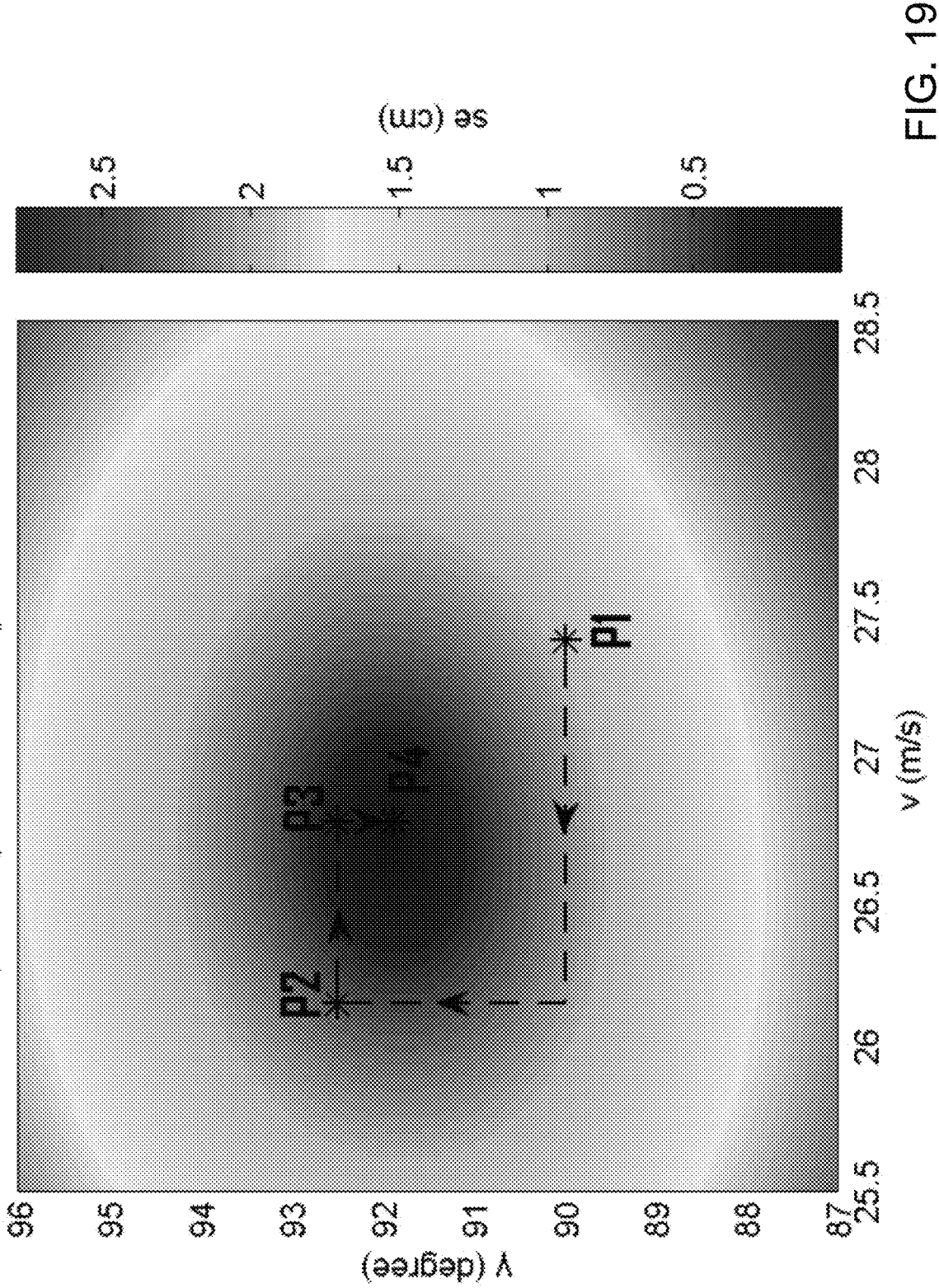

Preferably, one uses a more efficient algorithm as shown in FIG. 18. In every round of the function, one first uses 2 steps to reach the approximate solution under current precision, i.e. first optimize by solely adjusting v, then optimize by solely adjusting y. The reason why these 2 steps work is that the shape of se(v, y) is a cone. The precision can be improved by reducing the searching step by half round by round until the error requirement is met. FIG. 19 shows an example of the optimizing path. In this example, first the velocity and angle is initialized to be $P_i$: v=27.4 m/s, y=90°, se=107.8 cm, which is the solution obtained by the windless model. With precision $prs_v$=1.25, $prs_y$=2.5, the algorithm adjust v and then y, reaching a approximate solution $P_2$: v=26.15 m/s, y=92.5°, se=57.0 cm. Then it improves the precision to $prs_v$=0.625, $prs_y$=1.25 and reaches $P_3$: v=26.755 m/s, y=92.5°, se=26.9 cm in the next round. Finally, it meets the error required at $P_4$: v=26.7750 m/s, y=91.8750°, se=8.5 cm at precision prs,=0.3125, $prs_y$=0.625 and stops.

Using the adaptive searching step, the global minimum can always be reached, such that the spraying error se=0. However, in practice the instruments can never be exactly accurate, and one does not always require a completely accurate shifting as water can move on the ground within a certain range. On the other hand, the higher precision wind shifting compensation consumes more time, which limits the real-time implementation of the algorithm, thus the appropriate threshold can be set according to the computing power as well as the precision of the equipment.

Figure 20:
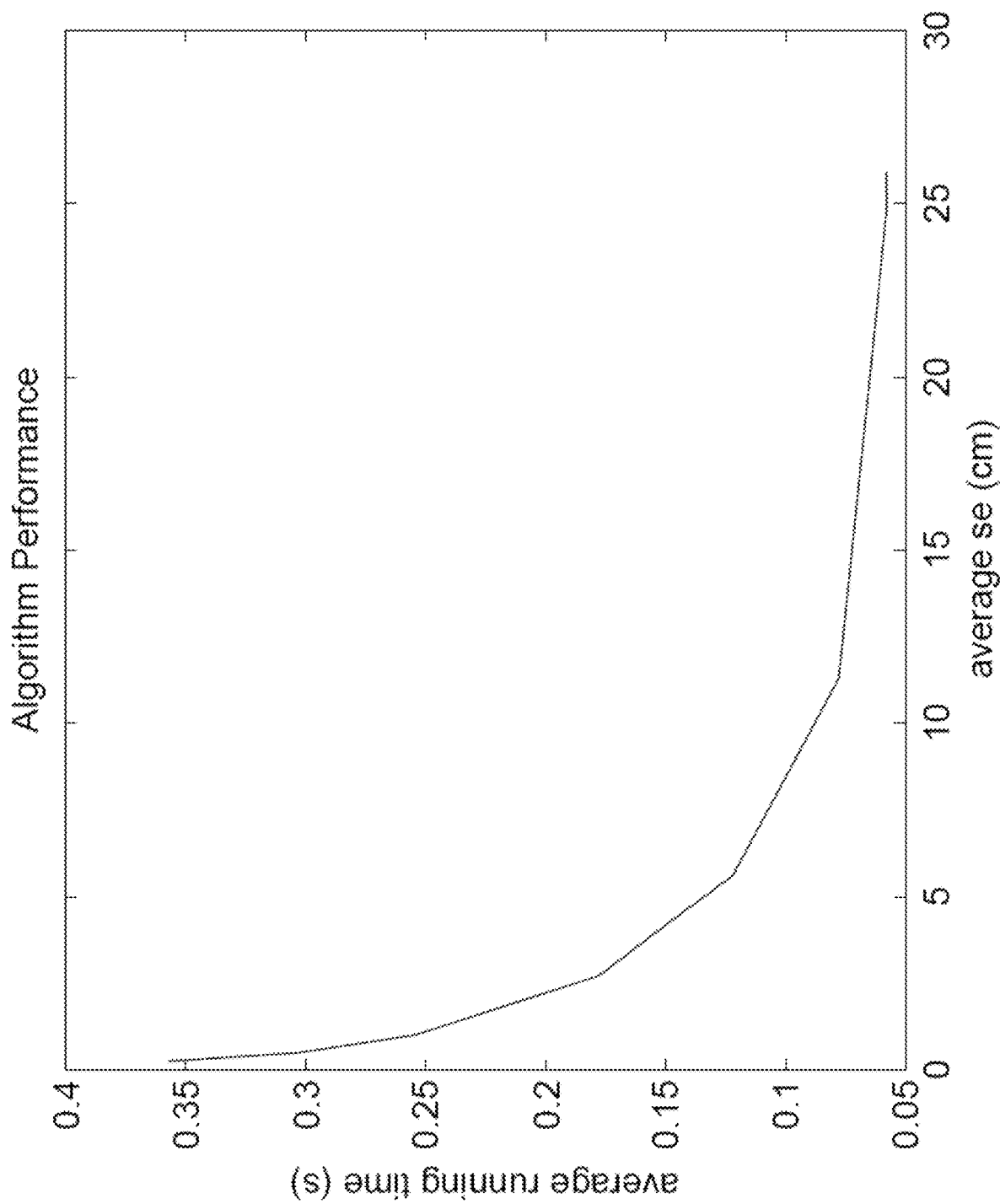
Figures 21A, 21B, 21C:
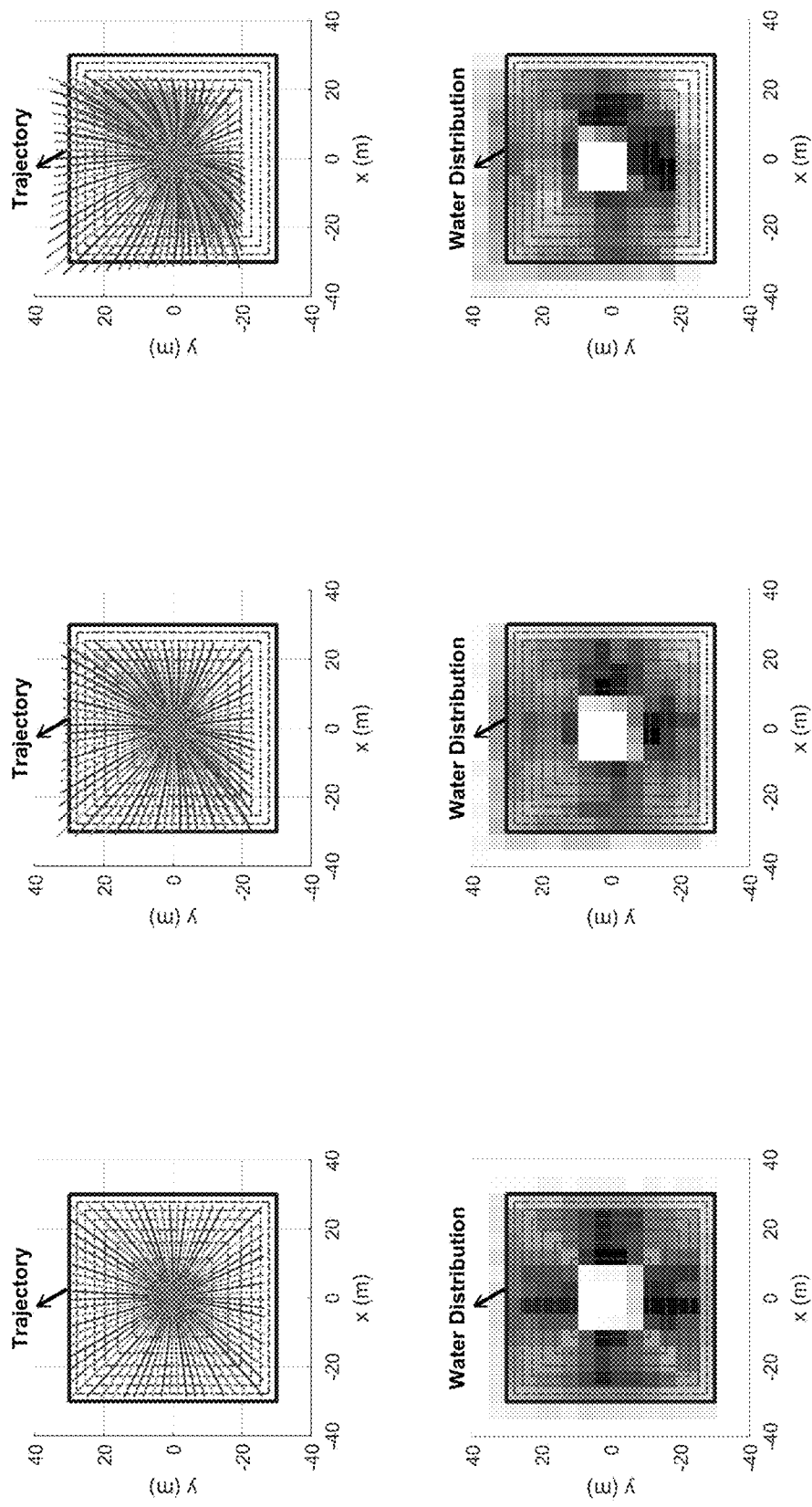
Figures 22D, 22E, 22F:
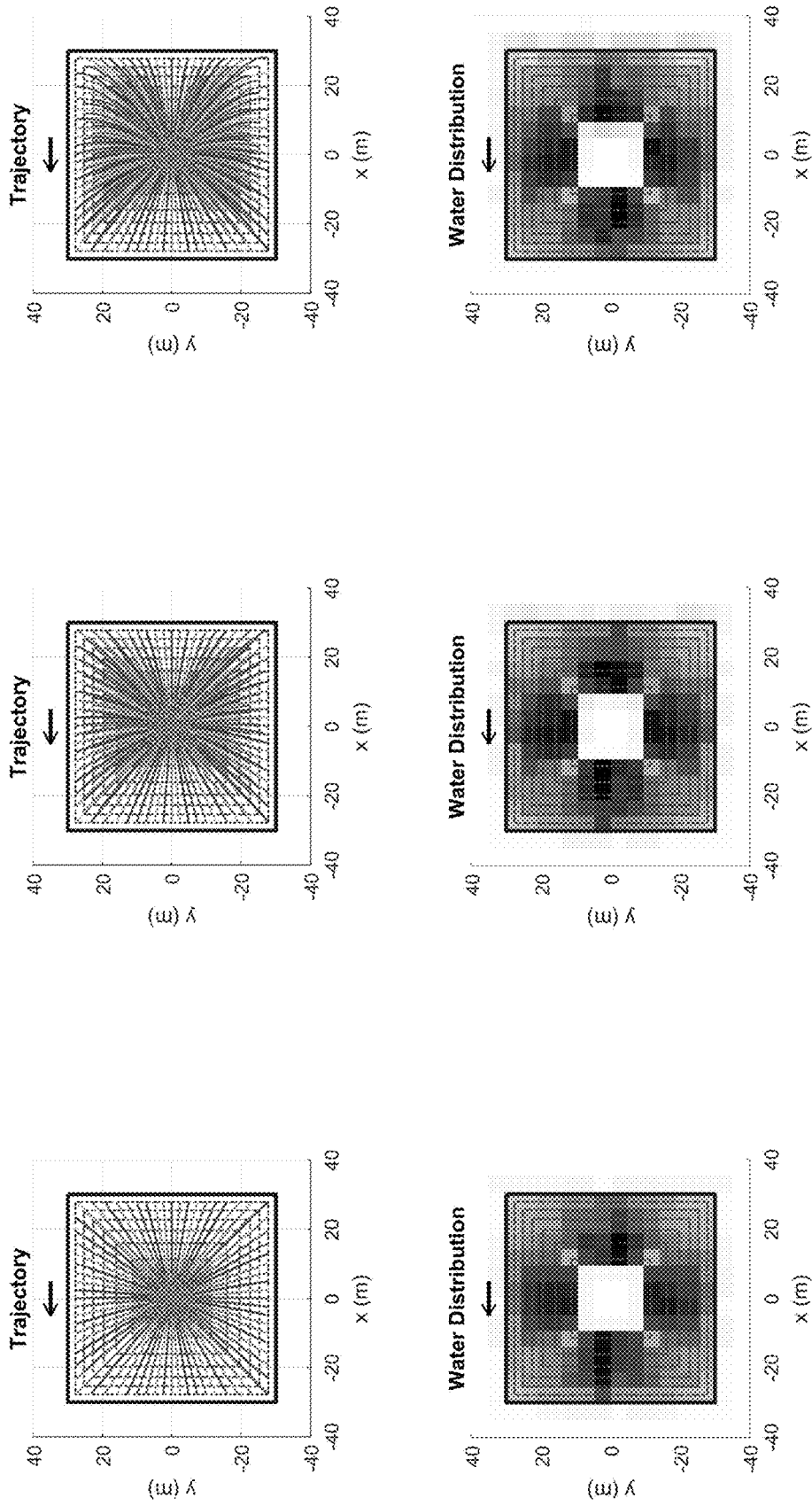
Figures 23D, 23E, 23F:
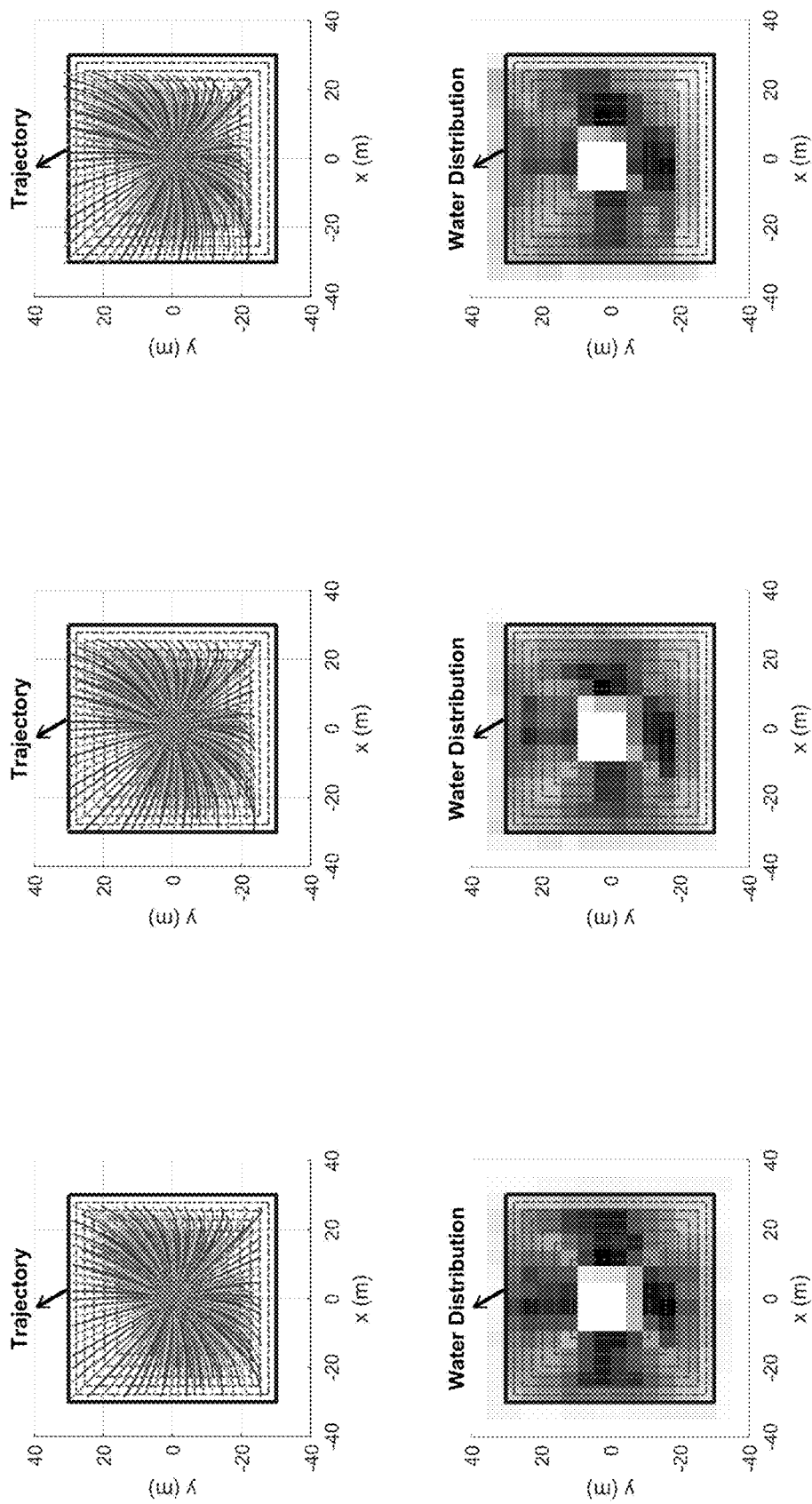

In light of this, the wind shifting algorithm is applied with different threshold value, and the corresponding time is reported in Table 5 and FIG. 20.

TABLE 5

| acceptable maximal se | average running time[1] | average se |
|---|---|---|
| 200 cm | 0.057981 s | 25.9066 cm |
| 100 cm | 0.057785 s | 25.9066 cm |
| 50 cm | 0.057619 s | 24.8865 cm |
| 20 cm | 0.077819 s | 11.3012 cm |
| 10 cm | 0.121891 s | 5.6259 cm |
| 5 cm | 0.177913 s | 2.7142 cm |
| 2 cm | 0.254274 s | 1.0006 cm |
| 1 cm | 0.302861 s | 0.4923 cm |
| 0.5 cm | 0.357425 s | 0.2433 cm |

[1]Measured by 1000 test cases using Matlab code on laptop with Intel i7-5500U processor.

Wind Shifting Simulation

Based on the wind shifting algorithm set out above, the algorithm was applied to a 30 m×30 m lawn as in the FIG. 15. Six cases were tested as per the below:

Wind from south to north with 30 degree angle with the speed of 1, 3 and 5 m/s respectively; and Wind from east to west with the speed of 1, 3 and 5 m/s respectively.

The results before and after shifting are reported in FIGS. 21A through 21F and FIGS. 22A through 22F, the corresponding MSE and Entropy are reported in Table 6 and 7.

TABLE 6

| wind speed (m/s) | 0 | 1 | 2 | 3 | 4 | 5 |
|---|---|---|---|---|---|---|
| Before shifting | | | | | | |
| MSE (×10⁻⁵) | 1.11 | 1.22 | 1.27 | 1.51 | 1.77 | 2.13 |
| Entropy | 4.82 | 4.81 | 4.80 | 4.77 | 4.73 | 4.68 |
| After shifting | | | | | | |
| MSE (×10⁻⁵) | 1.11 | 1.06 | 1.08 | 1.08 | 1.08 | 1.07 |
| Entropy | 4.82 | 4.82 | 4.82 | 4.82 | 4.82 | 4.82 |

TABLE 7

/CATENA 00 (2016) 1-29

| wind speed (m/s) | 0 | 1 | 2 | 3 | 4 | 5 |
|---|---|---|---|---|---|---|
| Before shifting | | | | | | |
| error(×10⁻³) | 1.11 | 1.15 | 1.30 | 1.53 | 1.84 | 2.19 |
| entropy | 4.82 | 4.82 | 4.80 | 4.76 | 4.72 | 4.67 |
| After shifting | | | | | | |
| error(×10⁻³) | 1.11 | 1.08 | 1.09 | 1.10 | 1.09 | 1.09 |
| entropy | 4.82 | 4.82 | 4.82 | 4.82 | 4.82 | 4.82 |

From Table 6 and 7, it can be seen that the wind shifting algorithm provides very good shifting results in terms of MSE and Entropy. Particularly, in some cases the precipitation after shifting is even more uniform than the case without wind: when the wind speed w=5 m/s, the MSE without shifting is 2.13 and that with shifting is 1.07, which is a significant improvement. It should also be noted that the shifting results are very stable, for instance, the Entropy after shifting is always 4.82 in both cases.

Sensitivity Analysis

To achieve the best wind shifting effect, the wind condition should ideally be updated in real time. However, it is quite normal that the wind measuring apparatus are not accurate and contain certain delays. Therefore, sensitivity analysis is essential to test the performance of the shifting algorithm when certain errors are included in the measured wind. To do this, a constant measured wind is used such that the wind shifting parameter unchanged, and let the actual wind change, then test if the performance of wind shifting still be good, or it will deteriorate quickly.

Assuming that the measured wind is 5 m/s, and the actual wind is from 2 m/s to 8 m/s, which denotes about 60% measured error in terms of wind speed. The shifting results are reported in FIGS. 23A through 23F.

Similar to the previous cases, the precipitation uniformity is quantified when the measure error exists in terms of MSE as well as Entropy as listed in following Table 8

TABLE 8

| actual wind (m/s) | 0 | 1 | 2 | 3 | 4 | 5 | 6 | 7 | 8 | 9 | 10 |
|---|---|---|---|---|---|---|---|---|---|---|---|
| measured error ($W_m - W_a$) | 5 | 4 | 3 | 2 | 1 | 0 | 1 | 2 | 3 | 4 | 5 |
| error ($\times 10^{-5}$) | 1.98 | 1.79 | 1.60 | 1.32 | 1.17 | 1.07 | 1.21 | 1.33 | 1.71 | 2.14 | 2.73 |
| entropy | 4.71 | 4.75 | 4.77 | 4.80 | 4.81 | 4.82 | 4.81 | 4.79 | 4.74 | 4.67 | 4.60 |

The shifting error vs. the wind measuring error was reported in terms of wind speed and wind angle for the measure wind w=6 MPH and w=11 MPH.

Computation of Target Distances

The wind shifting algorithm can be used to calculate the required flow velocity and spray angle to reach any target point on a predetermined lawn. To cover the whole lawn, different target distances td are set up for each round of spraying.

Figure 24:
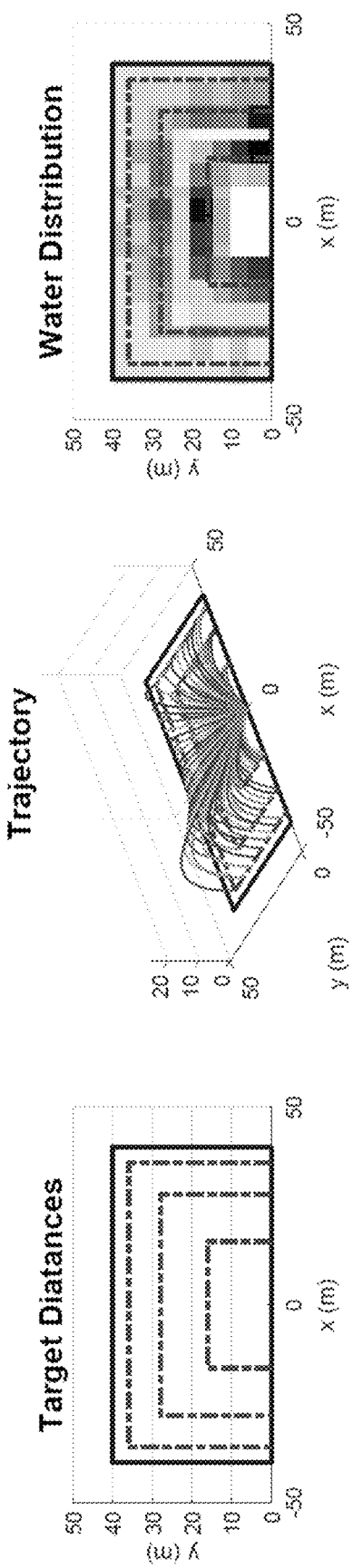
Figure 25:
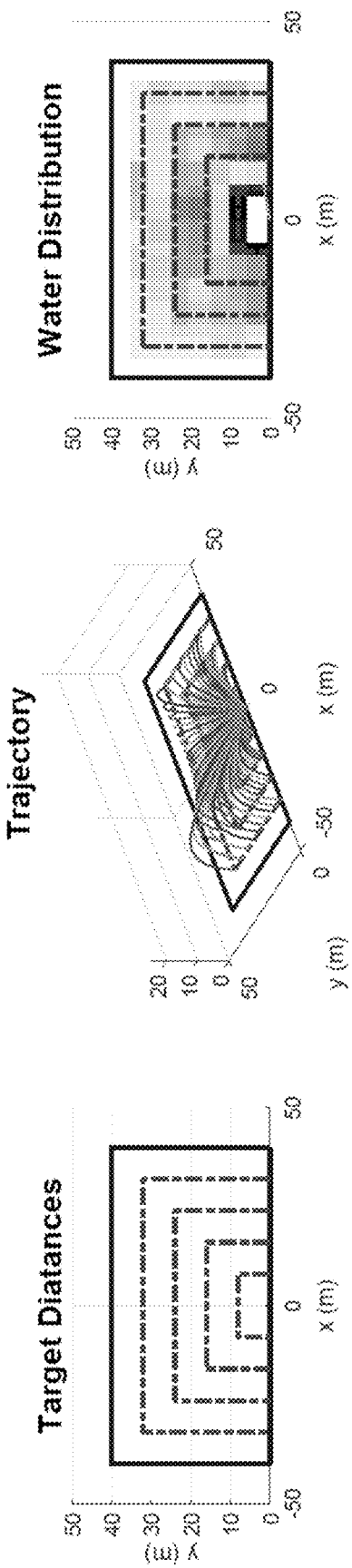
Figure 26:
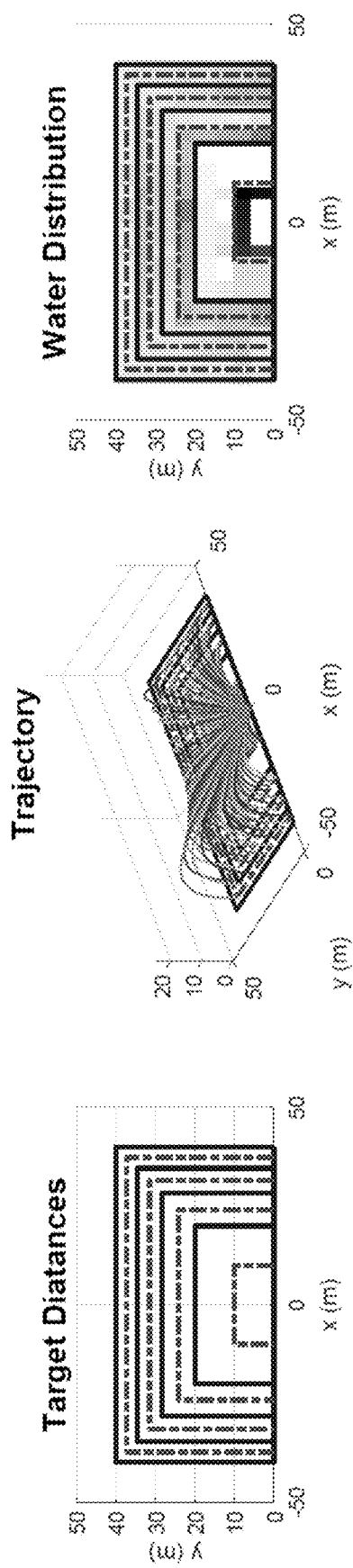
Figure 27:
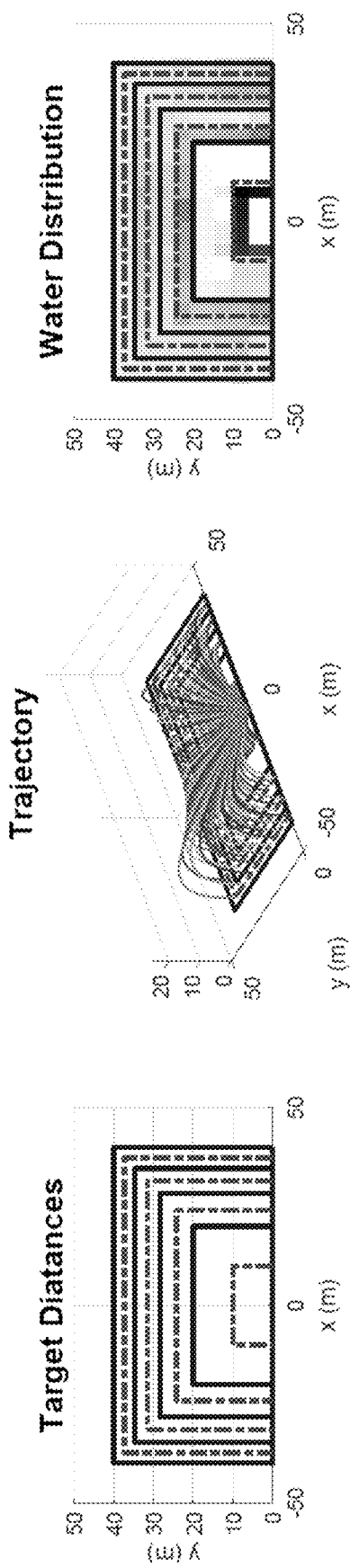
Figure 28:
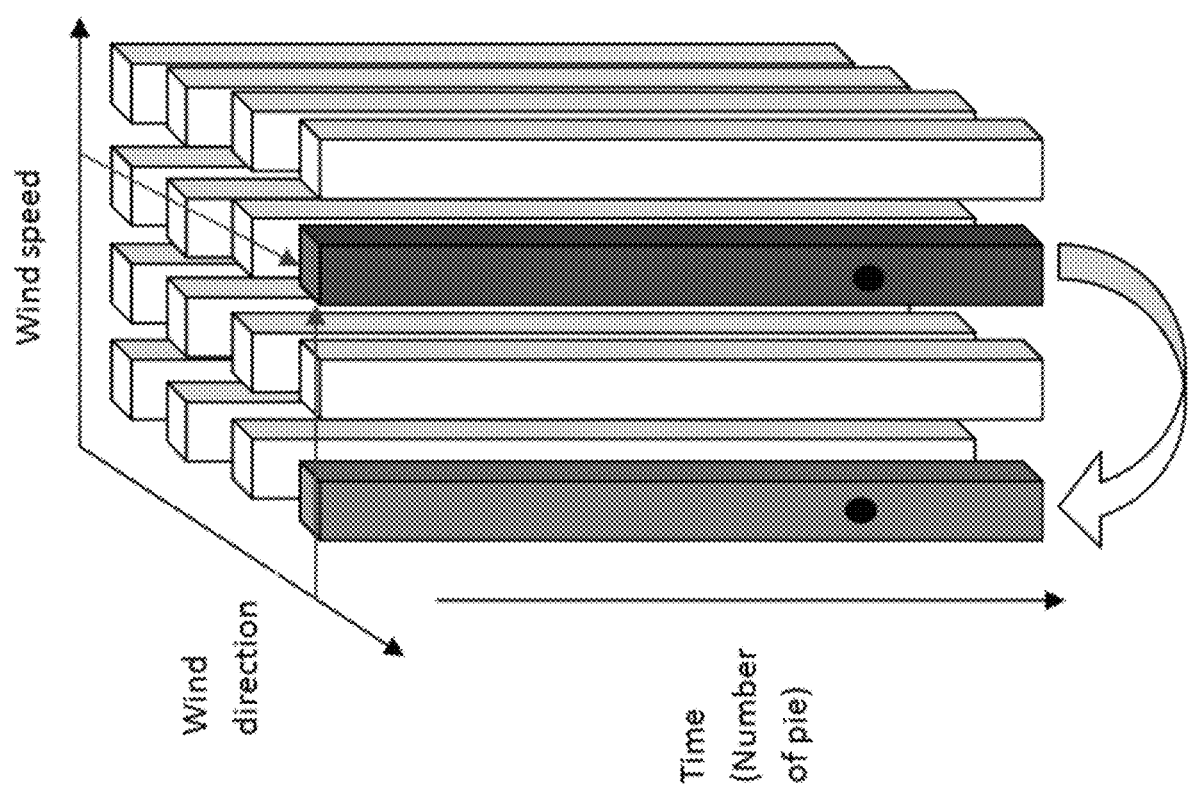

FIG. 24 provides an illustration of an example in which 3 target distances were

TABLE 9-continued

| | arithmetic progression | | n-divide method | | divider lines method | |
|---|---|---|---|---|---|---|
| n | entropy (nat) | mse ($10^{-5}$) | entropy (nat) | mse ($10^{-5}$) | entropy (nat) | |
| 18 | 6.3583875 | 4.525970252 | 1.606871875 | 4.73047667 | 0.788395313 | 4.780496854 |
| 19 | 6.164800781 | 4.52945914 | 1.572677344 | 4.729296313 | 0.804582031 | 4.779366649 |
| 20 | 6.06593125 | 4.529817106 | 1.356619531 | 4.750071517 | 0.798092969 | 4.779872878 |

For a multiple pull back spraying process, the proportion of the pull back amount can also be included in the database in the format of a 4D matrix. The platform includes a Graphic User Interface (GUI) to generate the required database.

According to an embodiment of the present invention, the sprinkler apparatus used in conjunction with a system compensating for wind effect comprises: (a) a base housing configured to confiningly receive a pressurized water flow; (b) a nozzle housing coupled to the base housing, the nozzle housing sized to slidingly couple with the base housing to pop-up into an operating position or retract into a nested position; (c) an upper nozzle assembly positioned at a top end of the nozzle housing, the upper nozzle assembly comprising a rigid outer frame and a resilient inner nozzle positioned therein, the diameter of the inner nozzle being smaller than the rigid outer frame to provide space for the inner nozzle to distend to a maximum orifice size determined by the circumference of the outer frame, the resilient inner nozzle responsive to the rate of pressurized water flow to distend up to the maximum orifice size to vary the wetted radius of discharged water from the upper nozzle assembly; (d) a lower nozzle assembly positioned below the upper nozzle assembly at the top end of the nozzle housing, the lower nozzle assembly comprising a vertical slit-shaped aperture through which water is discharged in a curtain effect; and (e) a flow control valve assembly fluidly coupled to the base housing to controllably supply the pressurized water flow; wherein the upper and lower nozzle assemblies together achieve a substantially uniform elliptical spray pattern.

Programmable Spray Pattern—Uniformity Distribution Optimization

As a person skilled in the art would know, the spray pattern of a sprinkler apparatus is known to have inconsistencies in uniformity. Inconsistencies in spray pattern uniformity can result in over-watering and/or under-watering of the water receiving area leading to inefficient irrigation. To minimize such inconsistencies, uniformity of water distribution by a sprinkler apparatus used in the purposes of the present disclosure can be programmably controlled, according to some embodiments, using computer instrumentation programmed to create and implement a spray pattern that is designed to compensate for inconsistencies in spray pattern uniformity based on nozzle profile and target precipitation density for the water receiving area. In such embodiments, the rate of flow of the pressurized water supply into and out of the flow control valve assembly and into and out of the pop-up type sprinkler head is modulated to vary the wetted radius of the water projected outward from the sprinkler head with each sweep of the sprinkler, so that the water receiving area is uniformly watered over the geometry of its entire area.

According to a preferred embodiment of the present invention, a sprinkler apparatus used in conjunction with the system according to the present disclosure can comprise computer instrumentation programmed to select a desired target level of precipitation density for the water receiving area; determine the number of sprinkler sweeps needed to achieve the selected precipitation density; pair the number of determined sprinkler sweeps with the selected precipitation density to determine the amount to pull back (i.e., reduce the wetted radius) on each sweep; determine a new flow rate based on the amount of pull back determined; and generate a spray pattern that applies the pulled back flow rates at the calculated rates on each sprinkler sweep to correct the inconsistencies in the uniformity of the spray pattern. In this way, a sprinkler spray pattern can be created that is adjusted with each spray sweep to correct inconsistencies in the uniformity of the spray pattern so that the water receiving area is ideally as optimally uniformly watered as possible (within the limitations of the instrumentation) over the geometry of its entire area.

Another exemplary embodiment of the present disclosure pertains to a method for irrigating an irregularly shaped and/or an asymmetrically shaped water receiving area while enduring winds which affect the optimal water distribution. The method generally comprises: (a) providing a sprinkler system as described above; (b) determining the geometry and irrigation needs of the water receiving area; (c) selectively diverting the water supply to the one or more sprinkler apparatus suitable to the geometry and irrigation needs determined for the water receiving area; (d) positioning the orientation of each of the one or more sprinkler apparatus according to the geometry and irrigation needs determined for the water receiving area; and (e) adjusting the pressurized water flow to each of the one or more sprinkler apparatus according to the geometry and irrigation needs determined for the water receiving area and, optionally, (f) altering the sprinkler head speed through out each sprinkler sweep to correct inconsistencies in the uniformity of the spray pattern. According to further embodiments, the step of adjusting in step (e) comprises optimizing each of the one or more sprinkler apparatus to create a sprinkler spray pattern that is adjusted with sprinkler sweep to correct inconsistencies in the uniformity of the spray pattern, said optimizing comprising: (a) selecting a desired target level of precipitation density for the water receiving area; (b) determining the number of sprinkler sweeps needed to achieve the selected precipitation density; (c) pairing the number of determined sprinkler sweeps with the selected precipitation density to determine the amount to pull back on each sweep; (d) determining a new flow rate based on the amount of pull back determined; and (e) generating a spray pattern that applies the pulled back flow rates at the calculated rates on each sprinkler sweep to correct inconsistencies in the uniformity of the spray pattern.

According to a preferred embodiment of the present invention, the sprinkler system can further include a system controller or other computer instrumentation to synchronize the operation of each sprinkler apparatus in the system. In other preferred embodiments, the controller or other computer instrumentation is programmable for example, following a logic and steps specific to the lawn to be watered.

Exemplary components for the controller include a microprocessor, a programmable logic circuit (or "PLC"), an analog control circuit, and electronic components (e.g., transistors, resistors, diodes, etc.) on a circuit board.

According to further embodiments, the system can be programmed to establish a watering program that is activated in response to the environmental conditions of the water receiving area. In such embodiments, for example, the system can comprise sensors for continual monitoring of the conditions of the water receiving area in order to determine whether watering is required, and further to establish the parameters for achieving sufficient watering for the particular water receiving area. According to certain embodiments, the sensors are moisture sensors for continually monitoring the soil to determine when watering is required, how it is watered, and for how long it is watered. For example, the system can be configured to monitor one or more environmental conditions to make this determination, including without limitation, moisture level of the soil, temperature of the soil, solar load on the soil, salinity of the soil, wind measurements, and/or precipitation measurements. Once the system determines that watering is required, the system is activated to water the water receiving area for a predetermined time. Moisture values can continue to be monitored and compared to original values in order to determine water absorption by the soil, and/or achievement of target moisture rates.

According to a preferred embodiment of the present invention, the sprinkler system can comprise computer instrumentation programmed to select a desired target level of precipitation density for the water receiving area; determine the number of sprinkler sweeps needed to achieve the selected precipitation density; pair the number of determined sprinkler sweeps with the selected precipitation density to determine the amount to pull back (i.e., reduce the wetted radius) on each sweep; determine a new flow rate based on the amount of pull back determined; and generate a spray pattern that applies the pulled back flow rates at the calculated rates on each sprinkler sweep to correct the inconsistencies in the uniformity of the spray pattern. In this way, a sprinkler spray pattern can be created that is adjusted with each spray sweep to correct inconsistencies in the uniformity of the spray pattern and thereby further optimize the uniformity of watering the specific water receiving area.

Although the invention has been described with reference to certain specific embodiments, various modifications thereof will be apparent to those skilled in the art without departing from the scope of the invention. All such modifications as would be apparent to one skilled in the art are intended to be included within the scope of the following claims.

What is claimed is:

1. An irrigation system for irrigating a user-defined target area, the irrigation system comprising:
    a sprinkler having a spray angle controllable according to one or more instructions received from a controller;
    a flow control valve between a water supply and the sprinkler for controlling a flow velocity of water sprayed by the sprinkler according to the one or more instructions received from the controller;
    a wind detector located proximate the user defined target area for measuring a wind speed and a wind direction and sending the wind speed and the wind direction to the controller; and
    the controller coupled to the sprinkler, the flow control valve and the wind detector;
    wherein, by executing a plurality of computer coded instructions of a windshifting algorithm, a processor of the controller is operable to generate the one or more instructions to thereby spray water from the sprinkler to a target position within the user-defined area at least as follows:
        the processor first determines the spray angle and the flow velocity according to a known position of the sprinkler relative to the target position assuming no wind is present;
        the processor then calculates an error representing a difference between the target position and a position where water would be sprayed if utilizing the spray angle and the flow velocity and taking into account the wind speed and the wind direction received from the wind detector;
        when the error is greater than a threshold representing a desired precision, the processor repeatedly optimizes the spray angle and the flow velocity, and, each time adjusting one of the spray angle and the flow velocity, recalculating the error utilizing the spray angle and the flow velocity as adjusted until the error is less than the threshold representing the desired precision; and
        when the error is less than the threshold representing the desired precision, the processor generates the one or more instructions to thereby control the sprinkler to spray water to toward the target position utilizing the spray angle and the flow velocity as determined by the processor to result in the error less than the threshold.

2. The irrigation system according to claim 1, wherein the wind detector is an anemometer.

3. The irrigation system according to claim 2, wherein the anemometer is a vane anemometer.

4. The irrigation system according to claim 1, wherein the wind detector is adapted to wirelessly relay information to the processor.

5. The irrigation system according to claim 1, wherein the sprinkler is of a single head rotary type.

6. The irrigation system according to claim 1, further comprising a manifold fluidly connected to the water supply via the flow control valve, wherein said manifold is operated by the one or more instructions from the controller.

7. The irrigation system according to claim 1, wherein the controller is a computer.

8. The irrigation system of claim 1, wherein the processor further determines the spray angle and the flow velocity according to stored lawn contour information.

9. The irrigation system of claim 1, wherein the processor further determines the spray angle and the flow velocity from geospatial lawn contour information.

10. The irrigation system of claim 1, wherein, when the error is greater than the threshold representing the desired precision, the processor repeatedly optimizes the spray angle and the flow velocity by searching for an optimal flow velocity and optimal spraying angle utilizing a method of traversal.

11. The irrigation system of claim 1, wherein, when the error is greater than the threshold representing the desired precision, the processor repeatedly optimizes the spray angle and the flow velocity in real time.

12. The irrigation system of claim 1, wherein:
    the controller stores a database pre-determined spray angle and flow velocity values; and
    when the error is greater than the threshold representing the desired precision, the processor repeatedly optimizes the spray angle and the flow velocity by looking up pre-determined spray angle and flow velocity values in the database.

13. The irrigation system of claim 1, wherein, when the error is greater than the threshold representing the desired precision, the processor repeatedly optimizes the spray angle and the flow velocity independently from one another by solely adjusting the spray angle and by solely adjusting the flow velocity.

\* \* \* \* \*